US012811037B2

(12) United States Patent
Shiga

(10) Patent No.: US 12,811,037 B2
(45) Date of Patent: Nov. 24, 2026

(54) MAGNET, AND SMALL DEVICE, MICROACTUATOR, AND SENSOR THAT USE SAID MAGNET

(71) Applicant: TDK Corporation, Tokyo (JP)

(72) Inventor: Daisuke Shiga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 169 days.

(21) Appl. No.: 18/022,560

(22) PCT Filed: Aug. 26, 2021

(86) PCT No.: PCT/JP2021/031401
§ 371 (c)(1),
(2) Date: Feb. 22, 2023

(87) PCT Pub. No.: WO2022/045260
PCT Pub. Date: Mar. 3, 2022

(65) Prior Publication Data
US 2023/0317328 A1 Oct. 5, 2023

(30) Foreign Application Priority Data
Aug. 27, 2020 (JP) ................................ 2020-143647

(51) Int. Cl.
*H01F 1/055* (2006.01)
*H01F 7/02* (2006.01)
(Continued)

(52) U.S. Cl.
CPC ............. *H01F 1/055* (2013.01); *H01F 7/021* (2013.01); *H01F 10/265* (2013.01); *H01F 41/22* (2013.01); *H01F 41/26* (2013.01)

(58) Field of Classification Search
CPC ........ H01F 1/055; H01F 10/16; H01F 10/265; H01F 41/22; H01F 41/26; H01F 7/021; C22C 19/07
See application file for complete search history.

(56) References Cited

U.S. PATENT DOCUMENTS

2004/0195924 A1* 10/2004 Kuwert ................ H02K 1/2733 310/156.13
2006/0005898 A1 1/2006 Liu et al.
(Continued)

FOREIGN PATENT DOCUMENTS

CN 1985338 A 6/2007
EP 3 611 740 A1 2/2020
(Continued)

OTHER PUBLICATIONS

Sharma et al., Epitaxy Induced Highly Ordered Sm2O17—SmCo5 Nanoscale Thin Film Magnets, ACS Applied Materials & Interfaces, vol. 13, Issue 27, Jul. 14, 2021, pp. 31321-32600 (Year: 2021).*

(Continued)

*Primary Examiner* — Holly Rickman
*Assistant Examiner* — Linda N Chau
(74) *Attorney, Agent, or Firm* — Faegre Drinker Biddle & Reath LLP

(57) ABSTRACT

Provided is a magnet including a yoke portion that contains a soft magnetic material, and a magnet portion that is formed on a main surface of the yoke portion and contains a hard magnetic material. An interface of the magnet portion and the yoke portion has an uneven shape.

19 Claims, 10 Drawing Sheets

(51) Int. Cl.

| | |
|---|---|
| ***H01F 10/26*** | (2006.01) |
| *H01F 41/22* | (2006.01) |
| *H01F 41/26* | (2006.01) |

(56) References Cited

U.S. PATENT DOCUMENTS

| | | | | |
|---|---|---|---|---|
| 2008/0236441 | A1 | 10/2008 | Nobe | |
| 2009/0085416 | A1 | 4/2009 | Masuzawa et al. | |
| 2015/0380134 | A1* | 12/2015 | Machida | C22C 19/07 335/302 |

FOREIGN PATENT DOCUMENTS

| | | | |
|---|---|---|---|
| JP | H09-078208 | A | 3/1997 |
| JP | 2007-236113 | A | 9/2007 |
| JP | 4614046 | B2 | 1/2011 |
| KR | 2004-0056573 | A | 7/2004 |

OTHER PUBLICATIONS

Jekal, Dependence of Atomic Thickness on Interfacial Conditions and Magnetocrystalline Anisotropy in SmCo5/Sm2Co17 Multilayer, Materials, MDPI, p. 1-7 (Year: 2018).*

Extended European Search Report issued Aug. 23, 2024 in Application No. 21861682.9.

International Preliminary Report on Patentability issued Mar. 9, 2023 in WO Patent Application No. PCT/JP2021/031401.

* cited by examiner

MAGNET, AND SMALL DEVICE, MICROACTUATOR, AND SENSOR THAT USE SAID MAGNET

TECHNICAL FIELD

The present disclosure relates to a magnet, and a small device, a microactuator, and a sensor which use the magnet.

BACKGROUND ART

As a reduction in size of various electronic devices is required, development of small devices such as a micromotor and a microactuator to be incorporated in the devices has been progressed. Magnetic characteristics of a permanent magnet that is used in the devices have a great influence on the size and performance of the devices.

Films of rare earth intermetallic compounds having a high energy product have attracted attention as a permanent magnet. Among these, an SmCo-based magnet film is in great demand in applications for which thermal stability of magnetic characteristics is required due to its high Curie point, or applications for which reliability is required due to high weather resistance.

For example, Patent Literature 1 discloses an Sm—Co alloy based perpendicular magnetic anisotropic thin film that is a thin film having perpendicular magnetic anisotropy in which an axis of easy magnetization is oriented in a direction perpendicular to a film surface. The Sm—Co alloy based perpendicular magnetic anisotropic thin film is formed on a base consisting of Cu or a Cu alloy, and consists of an alloy containing Sm and Co.

CITATION LIST

Patent Literature

Patent Literature 1: Japanese Patent No. 4614046

SUMMARY OF INVENTION

Technical Problem

By the way, the permanent magnet film that is used in a small device is required to have a high surface magnetic flux density. However, the Sm—Co alloy based perpendicular magnetic anisotropic thin film disclosed in Patent Literature 1 has room for improvement with regard to the surface magnetic flux density.

The present disclosure has been made in consideration of the problem, and an object thereof is to provide an SmCo-based magnet film having a high surface magnetic flux density. Another object of the present disclosure is to provide a magnet having a high surface magnetic flux density, and a small device, a microactuator, and a sensor which use the magnet.

Solution to Problem

A magnet according to an aspect of the invention includes a yoke portion that contains a soft magnetic material, and a magnet portion that is formed on a main surface of the yoke portion and contains a hard magnetic material. An interface of the magnet portion and the yoke portion has an uneven shape.

The magnet according to the aspect of the invention includes the yoke portion and the magnet portion, and the interface has the uneven shape, and thus a magnetic flux density of a convex portion can be made to be larger than a magnetic flux density of a concave portion. Accordingly, the magnet has a high surface magnetic flux density.

Here, the degree of unevenness of the interface may satisfy a relationship of 1.0<degree of unevenness<2.0. When the degree of unevenness exceeds 1.0, the magnetic flux density of the concave portion can be made to be larger than the magnetic flux density of the convex portion. When the degree of unevenness is less than 2.0, there is a tendency that a heat treatment temperature in a heat treatment process of manufacturing a magnet can be lowered, and a time can be shortened. Accordingly, decomposition of the magnet portion can be suppressed, and the magnetic flux density is further improved.

The yoke portion may contain $Sm_2Co_{17}$ as the soft magnetic material, the magnet portion may contain $SmCo_5$ as the hard magnetic material, $Sm_2Co_{17}$ may be formed on a main surface of $SmCo_5$, and a crystal orientation [00L] of $SmCo_5$ may be oriented in a thickness direction of $SmCo_5$. Since $SmCo_5$ has a Curie point of 700° C. or higher, thermal stability of magnetic characteristics is excellent. Since the crystal orientation [00L] of $SmCo_5$ is oriented in a direction perpendicular to a film surface, a high surface magnetic flux is obtained. In addition, since $Sm_2Co_{17}$ that has higher saturation magnetization in comparison to $SmCo_5$ and is soft magnetic exists as a base, these operate as a back yoke. Accordingly, in the magnet according to the aspect of the invention, the surface magnetic flux density is further improved.

The thickness of the magnet portion may be 1 to 200 μm. Since the thickness of $SmCo_5$ that is a hard magnetic material is 1 μm or more, the surface magnetic flux density tends to be further improved. Since the thickness of the magnet portion is 200 μm or less, the magnet according to the aspect of the invention can be preferably used in a small device.

Another aspect of the invention may be a small device that uses the magnet. Still another aspect of the invention may be a microactuator that uses the magnet. Further still another aspect of the invention may be a sensor that uses the magnet.

An SmCo-based magnet film according to another aspect of the invention includes an $Sm_2Co_{17}$ film, and an $SmCo_5$ film that is formed on the $Sm_2Co_{17}$ film. A crystal orientation [00L] of the $SmCo_5$ film is oriented in a thickness direction of the $SmCo_5$ film. Provided that, L is an any natural number.

According to the other aspect of the invention, since the SmCo-based magnet film includes the $Sm_2Co_{17}$ film, and the crystal orientation [00L] of the $SmCo_5$ film is oriented in the thickness direction of the $SmCo_5$ film, it is possible to provide an SmCo-based magnet film having a high surface magnetic flux density.

Here, the thickness of the $SmCo_5$ film may be 1 to 20 μm.

Advantageous Effects of Invention

According to an aspect of the invention, a magnet having a high surface magnetic flux density, and a small device, a microactuator, and a sensor which use the magnet are provided.

According to another aspect of the invention, an SmCo-based magnet film having a high surface magnetic flux density is provided.

DESCRIPTION OF EMBODIMENTS

<Magnet>

A magnet according to an embodiment will be described with reference to the accompanying drawings.

Figure 1:
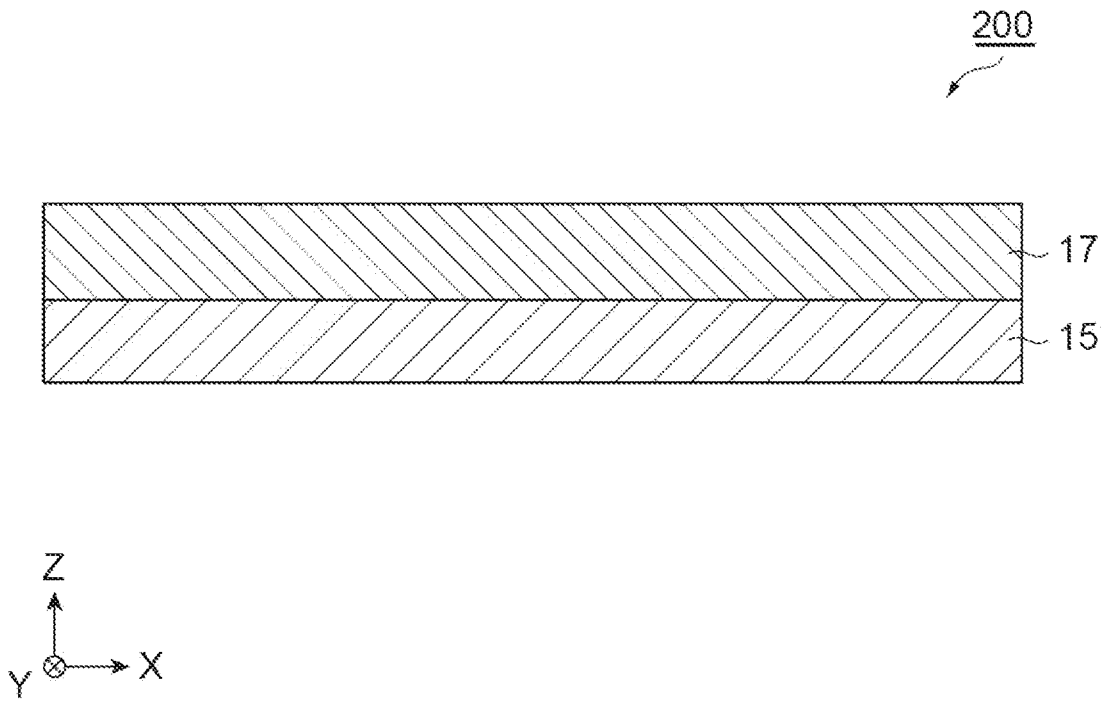
FIG. 1 is a schematic cross-sectional view of a magnet according to an embodiment of the invention.

As illustrated in FIG. 1, a magnet 200 according to this embodiment includes a yoke portion 15 containing a soft magnetic material, and a magnet portion 17 that is formed on a main surface of the yoke portion 15 and contains a hard magnetic material.

The yoke portion 15 contains a soft magnetic material. Examples of the soft magnetic material include metal Co, metal Fe, metal Ni, and an alloy and a compound which contain the metals. Examples of the alloy include $Sm_2Co_{17}$ and a silicon steel. Examples of the compound include ferrite.

For example, a ratio of the soft magnetic material contained in the yoke portion 15 may be 80% by mass or more, 85% by mass or more, 90% by mass or more, or 95% by mass or more.

The thickness of the yoke portion 15 is not particularly limited, and can be appropriately selected in correspondence with applications, but can be set to, for example, 0.0010 to 1 mm.

The magnet portion 17 contains a hard magnetic material. Examples of the hard magnetic material include $SmCo_5$, $Sm_5Fe_{17}$ (an alloy of Sm and Fe with an $Nd_5Fe_{17}$ type crystal structure), $SmFe_7$ (an alloy of Sm and Fe with a $TbCu_7$ type crystal structure), $Sm_2Fe_{17}N_3$ (an alloy of Sm, Fe, and N with a $Pr_2Mn17C_{1.77}$ type crystal structure), $SmFe_{12}$ (an alloy of Sm and Fe with a $ThMn_{12}$ type crystal type structure), and $Nd_2Fe_{14}B$ (an alloy of Nd, Fe, and B with an $Nd_2Fe_{14}B$ crystal structure). Atomic ratios of atoms contained in the alloys may deviate from a stoichiometric ratio.

For example, a ratio of the hard magnetic material contained in the magnet portion 17 may be 80% by mass or more, 85% by mass or more, 90% by mass or more, or 95% by mass or more.

The thickness of the magnet portion 17 is preferably 1 μm or more from the viewpoint that the surface magnetic flux density of the magnet 200 tends to be further improved, more preferably 1 μm or more, and still more preferably 5 μm or more. The thickness of the magnet portion 17 is preferably 200 μm or less from the viewpoint that the magnet 200 can be preferably used in a small device, more preferably 100 μm or less, and still more preferably 20 μm or less. The thickness of the magnet portion 17 can be measured by embedding the magnet 200 in a resin, polishing the resultant obtained sample to expose a cross-section of the magnet 200 from the resin, and observing the exposed cross-section of the magnet 200 with a scanning electron microscope (SEM).

An interface of the magnet portion 17 and the yoke portion 15 has an uneven shape. The shape of the interface can be measured by embedding the magnet 200 in a resin, polishing the resultant obtained sample to expose a cross-section of the magnet 200 from the resin, and observing the exposed cross-section of the magnet 200 with a scanning electron microscope (SEM).

The degree of unevenness of the interface of the magnet portion 17 and the yoke portion 15 preferably satisfies a relationship of 1.0<degree of unevenness<2.0, more preferably a relationship of 1.15<degree of unevenness<1.6, and still more preferably a relationship of 1.2<degree of unevenness<1.5. When the degree of unevenness exceeds 1.0, a magnetic flux density of a convex portion can be made to be larger than a magnetic flux density of a concave portion. When the degree of unevenness is less than 2.0, there is a tendency that a heat treatment temperature in a heat treatment process of manufacturing the magnet 200 can be lowered, and a time can be shortened. Accordingly, decomposition of the magnet portion 17 can be suppressed, and the magnetic flux density is further improved.

Figure 2:
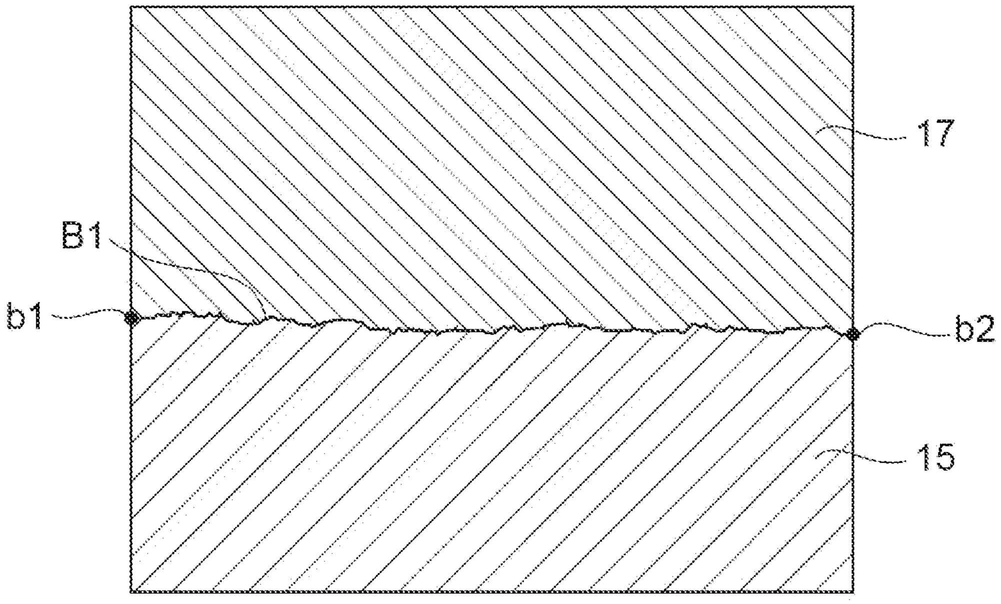
FIG. 2 is a schematic view of a portion that is cut out from an SEM photograph of a cross-section of the magnet according to the embodiment of the invention.

The degree of unevenness of the interface of the magnet portion 17 and yoke portion 15 can be measured by observing the interface with a scanning electron microscope (SEM). Specifically, the magnet 200 is embedded in a resin, and the resultant obtained sample is polished to expose a cross-section of the magnet 200 from the resin. The cross-section is observed with an SEM to obtain a backscattered electron image. An acceleration voltage when obtaining the backscattered electron image is set to 10 to 15 kV, and a working distance (WD) is set to 10 to 15 mm A portion (rectangle) to be provided for analysis is cut out from the obtained backscattered electron image, and the degree of unevenness is calculated by analyzing the cut-out image. FIG. 2 is a schematic view of a portion that is cut out from an SEM photograph (backscattered electron image) of a cross-section of the magnet 200. As illustrated in FIG. 2, cutting-out of the backscattered electron image is performed so that any one side of the cut-out image and a side opposite to the side intersect an interface B1 of the magnet portion 17 and the yoke portion 15 (b1 and b2), and the interface B1 is placed between the remaining two sides. In addition, cutting-out of the backscattered electron image is performed so that a length of a straight line connecting b1 and b2 to be described later becomes 100 μm or more. The cut-out image is subjected to image quality adjustment, binarization processing, and edge (contour) extraction processing. Then, a length from one end b1 to the other end b2 of the interface B1 in the cut-out image is measured. In addition, a length of a straight line connecting b1 and b2 is measured. As a reference of the length, a length displayed in a scale bar is used. The degree of unevenness can be calculated by dividing the length of the interface B1 by the length of the straight line connecting b1 and b2. A measurement magnification is 1000 times. The number of sites for observation by the SEM is set to two or more so as not to analyze only a part. The degree of unevenness is set to an average value of the degree of unevenness obtained from each of images of two or more sites.

Applications of the magnet 200 are not particularly limited, and the magnet 200 is suitable for, for example, a small device since the surface magnetic flux density is high. As the small device, a micromotor, a microactuator, and a sensor are suitable.

<SmCo-Based Magnet Film>

As an example of the magnet according to the embodiment, an SmCo-based magnet film according to an embodiment will be described. The SmCo-based magnet film according to the embodiment will be described with reference to the accompanying drawings.

Figure 3:
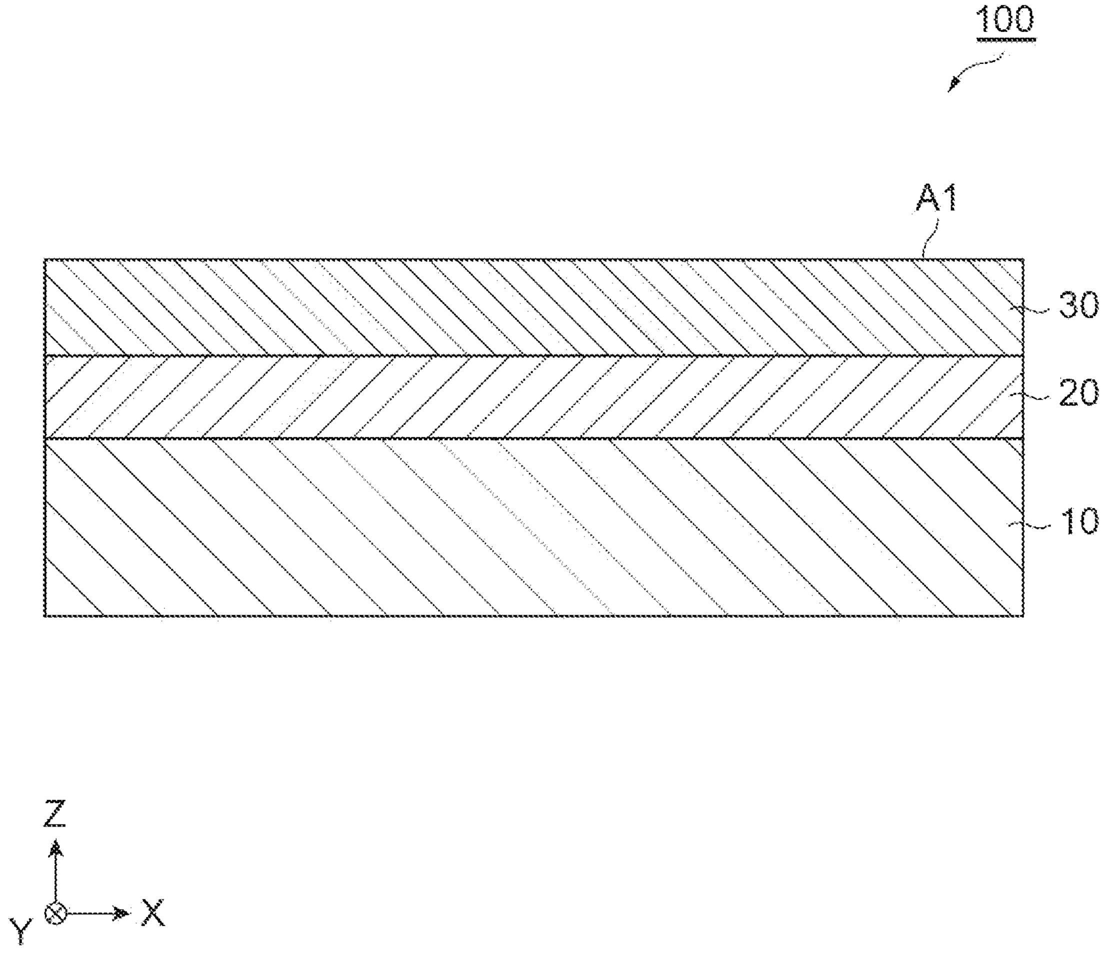
FIG. 3 is a schematic cross-sectional view of an SmCo-based magnet film according to an embodiment of the invention.

As illustrated in FIG. 3, an SmCo-based magnet film 100 (hereinafter, referred to as "magnet film 100") according to this embodiment includes an Mo substrate 10, an $Sm_2Co_{17}$ film 20 formed on the Mo substrate 10, and an $SmCo_5$ film 30 formed on the $Sm_2Co_{17}$ film 20. In the magnet film 100, the $Sm_2Co_{17}$ film 20 corresponds to the yoke portion, and the $SmCo_5$ film 30 corresponds to the magnet portion.

The Mo substrate 10 is a metal Mo plate. The purity of Mo in the Mo substrate may be 99% by mass or more, or 99.998% by mass or more. Another base material may be provided below the Mo substrate 10.

The thickness of the Mo substrate 10 is not particularly limited and can be appropriately selected in correspondence with applications, but can be set to, for example, 0.0010 to 0.5 mm.

The $Sm_2Co_{17}$ film 20 contains $Sm_2Co_{17}$ as a main phase. $Sm_2Co_{17}$ is an alloy of Sm and Co with a $Th_2Zn_{17}$ type crystal structure. A ratio between Sm atoms and Co atoms in $Sm_2Co_{17}$ may deviate from a stoichiometric ratio. The ratio between the Sm atoms and the Co atoms in $Sm_2Co_{17}$ may not be the stoichiometric ratio when adding various elements, for example, for improvement and the like of magnetic characteristics. Therefore, as long as $Sm_2Co_{17}$ has the $Th_2Zn_{17}$ type crystal structure, the ratio between the Sm atoms and the Co atoms may deviate from the stoichiometric ratio.

In this specification, "as a main phase" represents that a mass ratio in a film is the largest. The $Sm_2Co_{17}$ film 20 may include a phase different from $Sm_2Co_{17}$, for example, another crystal phase and a grain boundary phase. A ratio of $Sm_2Co_{17}$ in the $Sm_2Co_{17}$ film 20 may be, for example, 70% by mass or more, 80% by mass or more, 90% by mass or more, or 95% by mass or more.

The thickness of the $Sm_2Co_{17}$ film 20 is not particularly limited, and can be appropriately selected in correspondence with applications, but can be set to, for example, 1 to 100 μm. The thickness of the $Sm_2Co_{17}$ film 20 can be measured by embedding the magnet film 100 with a resin, polishing the resultant obtained sample to expose a cross-section of the magnet film 100 from the resin, and observing the exposed cross-section of the magnet film 100 with a scanning electron microscope (SEM).

The $SmCo_5$ film 30 contains $SmCo_5$ as a main phase. $SmCo_5$ is an alloy of Sm and Co with a $CaCu_5$ type crystal structure. A ratio between Sm atoms and Co atoms in $SmCo_5$ may deviate from a stoichiometric ratio. The ratio between the Sm atoms and the Co atoms in $SmCo_5$ may not be the stoichiometric ratio when adding various elements, for example, for improvement and the like of magnetic characteristics. Therefore, as long as $SmCo_5$ has the $CaCu_5$ type crystal structure, the ratio between the Sm atoms and the Co atoms may deviate from the stoichiometric ratio.

The $SmCo_5$ film 30 may include a phase different from $SmCo_5$, for example, another crystal phase and a grain boundary phase. A ratio of $SmCo_5$ in the $SmCo_5$ film 30 may be, for example, 70% by mass or more, 80% by mass or more, 90% by mass or more, or 95% by mass or more. Examples of the different phase include an Sm-rich phase in which a content ratio of Sm is higher in comparison to $SmCo_5$.

A crystal orientation [00L] of the $SmCo_5$ film 30 is oriented in a thickness direction of the $SmCo_5$ film, that is, in a direction perpendicular to a film surface A1. L is an any natural number. L indicates the same direction in any case. For example, L is 2.

In a case where the crystal orientation [00L] of the $SmCo_5$ film is oriented in the thickness direction of the $SmCo_5$ film, this case represents that the degree of orientation defined by Expression (1) is 50% or more.

The degree of orientation is based on a vector-corrected Lotgering method, and represents a ratio of the sum of diffraction peaks based on a crystal orientation [00L] component to the sum of diffraction peaks based on a crystal plane (hk1) of the $SmCo_5$ film. From the viewpoint that the surface magnetic flux density of the magnet film 100 is further improved, the degree of orientation is preferably 60% or more, more preferably 70% or more, and still more preferably 75% or more.

In Expression (1), I represents the intensity of a diffraction peak based on a crystal plane (hk1) when irradiating the $SmCo_5$ film 30 with X-rays. Each diffraction peak pertains to any one crystal plane indicated by mirror indexes. Examples of a crystal plane of the $SmCo_5$ film include a (002) plane, a (111) plane that is oblique to the (002) plane, a (110) plane that is perpendicular to the (002) plane, and the like in a case where 2θ is 30° to 60°.

In the following Expression (1), a numerator of a fraction on a right side is a value obtained by totaling the product of the intensity I of each peak and a vector correction coefficient β given to a crystal plane of each peak with respect to each diffraction peak of the $SmCo_5$ film which is observed in a range of 2θ=30° to 60°.

The vector correction coefficient β is cosine (cos θ) of an angle θ made between a (00L) plane that is a reference plane, and each crystal plane (hk1), and is a value different for each crystal plane (hk1) as described later.

On the other hand, a denominator of the fraction of the right side is the sum of the intensity I of each diffraction peak of the $SmCo_5$ film in the range of 2θ=30° to 60°.

[Mathematical Formula 1]

$$\text{Degree of orientation (\%)} = \frac{\sum_{2\theta=30^\circ}^{2\theta=60^\circ} \beta \cdot I(hkl)}{\sum_{2\theta=30^\circ}^{2\theta=60^\circ} I(hkl)} \times 100 \tag{1}$$

From the viewpoint that the surface magnetic flux density of the magnet film 100 is further improved, the thickness of the $SmCo_5$ film 30 is preferably 1 μm or more, more preferably 2 μm or more, and still more preferably 5 μm or more. An upper limit value of the thickness of the $SmCo_5$ film 30 is not particularly limited, and may be, for example, 200 μm or less, 100 μm or less, or 20 μm or less. The thickness of the $SmCo_5$ film 30 can be measured by embedding the magnet film 100 with a resin, polishing the resultant obtained sample to expose a cross-section of the magnet film 100 from the resin, and observing the exposed cross-section of the magnet film 100 with a scanning electron microscope (SEM).

A port or the entirety of the film surface A1 on a side opposite to a surface that is in contact with the $Sm_2Co_{17}$ film 20 in the $SmCo_5$ film 30 may be covered or may with $Sm_2O_3$, or may not be covered with $Sm_2O_3$.

A total thickness of the $Sm_2Co_{17}$ film 20 and the $SmCo_5$ film 30 is not particularly limited, and can be appropriately changed in correspondence with applications, but the total thickness may be, for example, 0.002 to 0.2 mm.

The magnet film 100 may not include the Mo substrate 10. For example, the Mo substrate may be removed by etching or the like after manufacturing.

The magnet film 100 may include a Co substrate instead of the Mo substrate 10. The purity of Co in the Co substrate may be similar to the purity of Mo in the Mo substrate. The thickness of the Co substrate may be similar to the thickness of the Mo substrate.

A planar shape of the magnet film 100 is not particularly limited, and can be appropriately set in correspondence with applications. A shape of the magnet film 100 when viewed from a Z-axis direction may be, for example, a square shape, a rectangular shape, and a circular shape. In a case where the shape of the magnet film 100 when viewed from the Z-axis direction is the square shape, a length of one side thereof may be, for example, 0.1 to 100 mm. In a case where the shape of the magnet film 100 when viewed from the Z-axis direction is the rectangular shape, a length in a long side direction may be, for example, 1 to 100 mm, and a length in a short side direction may be, for example, 0.1 to 50 mm When the shape of the magnet film 100 when viewed from the Z-axis direction is the circular shape, a diameter thereof may be, for example, 0.1 to 50 mm.

The surface magnet flux density of the magnet film 100 is preferably 5 mT or more, more preferably 7 mT or more, and still more preferably 10 mT or more. The surface magnetic flux density of the magnet film 100 can be measured by bringing a probe of a Hall element into contact with the film surface A1 of the $SmCo_5$ film of the magnet film 100 to trace the film surface A1, and converting an output voltage into a magnet flux density.

Applications of the magnet film 100 are not particularly limited, and from the viewpoint that the magnet film 100 has a high surface magnetic flux density, for example, a sensor, a micromotor, and a microactuator are suitable. The applications of the magnet film 100 are not particularly limited, and from the viewpoint that the magnet film 100 has a high surface magnetic flux density, a small device is suitable.

(Operational Effect)

The magnet film 100 includes the $Sm_2Co_{17}$ film 20 that has saturation magnetization higher than that of $SmCo_5$ and is soft magnetic. According to this, the $Sm_2Co_{17}$ film 20 operates as a back yoke that collects a magnetic flux. In addition, since the crystal orientation [00L] of the $SmCo_5$ film 30 is oriented in the thickness direction of the $SmCo_5$ film 30, that is, the crystal orientation [00L] that is an axis of easy magnetization of $SmCo_5$ and a thickness direction (direction perpendicular to the film surface A1 (Z-axis direction)) of the $SmCo_5$ film 30 match each other, the surface magnetic flux density of the magnet film 100 becomes high. In addition, since $SmCo_5$ has a Curie point of 700° C. or higher, thermal stability is excellent.

<Cylindrical SmCo-Based Magnet>

As an example of the magnet according to the embodiment, description will be given of a cylindrical SmCo-based magnet according to an embodiment with reference to the accompanying drawings.

Figure 4:
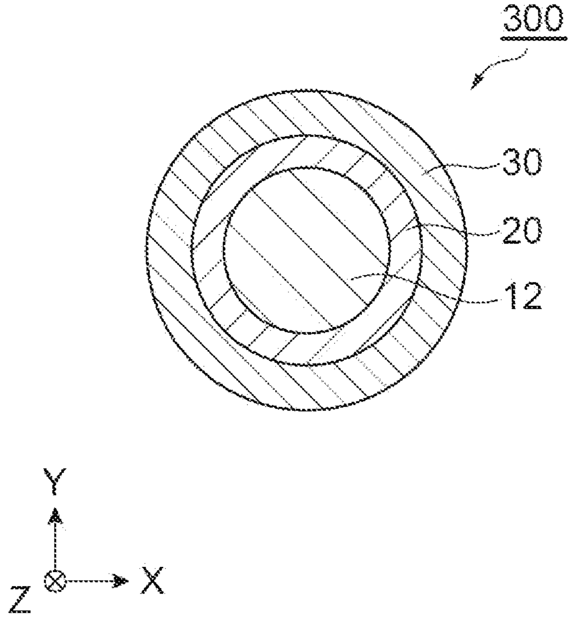
FIG. 4 is a schematic cross-sectional view of an SmCo-based magnet according to an embodiment of the invention.

FIG. 4 is a schematic view of a cross-section perpendicular to an axial direction of a cylindrical SmCo-based magnet

300 (hereinafter, also referred to as "magnet 300") according to this embodiment. The magnet 300 includes a Co base material 12, an $Sm_2Co_{17}$ film 20 that is formed on the Co base material 12, and an $SmCo_5$ film 30 that is formed on the $Sm_2Co_{17}$ film 20. In the magnet 300, the Co base material 12 and the $Sm_2Co_{17}$ film 20 corresponds to the yoke portion, and the $SmCo_5$ film 30 corresponds to the magnet portion.

A diameter of the Co base material 12 is not particularly limited, and can be appropriately selected in correspondence with applications, but the diameter can be set to, for example, 0.1 to 2.0 mm. The purity of Co in the Co base material 12 may be similar to the purity of Mo in the Mo substrate of the magnet film 100 according to the above-described embodiment.

The $Sm_2Co_{17}$ film 20 and the $SmCo_5$ film 30 according to this embodiment may be similar to the $Sm_2Co_{17}$ film 20 and the $SmCo_5$ film 30 in the magnet film 100 according to the above-described embodiment.

Figure 5:
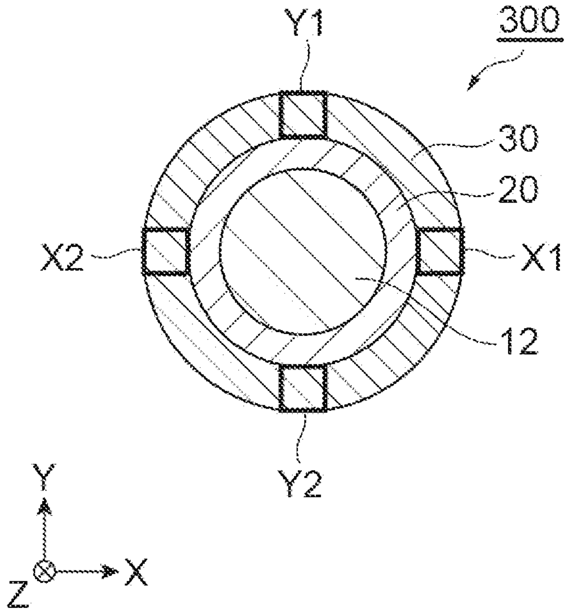
FIG. 5 is a schematic view of a measurement site for confirming presence or absence of radial orientation.

From the viewpoint that the surface magnetic flux density of the magnet 300 is further improved, it is preferable that a crystal orientation [00L] of the $SmCo_5$ film 30 is radially oriented in the magnet 300. Presence or absence of the radial orientation can be confirmed as follows. Specifically, the magnet 300 is embedded in a resin. A part of the resin is polished to expose a cross-section perpendicular to an axial direction of the cylindrical magnet 300 from the resin. In $SmCo_5$ of the exposed cross-section, orientation of the crystal orientation of $SmCo_5$ is measured by an electron back scatter diffraction patterns (EBSD) method. As illustrated in FIG. 5, in $SmCo_5$ of an exposed cross-section having an approximately circular shape, a measurement site is set to totally four sites including a site Y1 that is spaced apart in a Y direction perpendicular to a normal direction at the center of gravity of the cross-section, a site Y2 that is spaced apart in a −Y direction opposite to the Y direction, a site X1 that is spaced apart in an X direction perpendicular to the Y direction, and a site X2 that is spaced apart in a −X direction opposite to the X direction. In the Y1, a pole diagram of the crystal orientation [00L] of $SmCo_5$ in a case of observing the Y1 in the −Y direction with an XZ plane set as the front is obtained. In the Y2, a pole diagram of the crystal orientation [00L] of $SmCo_5$ in a case of observing the Y2 in the Y direction with the XZ plane set as the front is obtained. In the X1, a pole diagram of the crystal orientation [00L] of $SmCo_5$ in a case of observing the X1 in the −X direction with a YZ plane set as the front is obtained. In the X2, a pole diagram of the crystal orientation [00L] of $SmCo_5$ in a case of observing the X2 in the X direction with the YZ plane set as the front is obtained. The pole diagrams are diagrams showing a crystal orientation with a stereo projection method. In each of the pole diagrams, in a case where a dot is placed in the center, it is determined that the crystal orientation [00L] of $SmCo_5$ is radially oriented in the cylindrical magnet 300.

A height of the magnet 300 may be, for example, 5 to 30 mm. A diameter of the magnet 300 may be, for example, 0.5 to 3 mm. The surface magnetic flux density of the magnet 300 may be similar to that of the magnet film 100. Applications of the magnet 300 may be similar to that of the magnet film 100.

<Method of Manufacturing SmCo-Based Magnet Film>

FIRST EMBODIMENT

Next, a method of manufacturing an SmCo-based magnet film according to a first embodiment will be described in detail. The method of manufacturing the SmCo-based magnet film according to this embodiment, for example, may be a method including a process of immersing the Mo substrate 10 in a first plating bath containing an Sm source and a Co source, and forming the $Sm_2Co_{17}$ film on at least one main surface of the Mo substrate 10 by an electrolytic plating method (hereinafter, also referred to as "first electrolytic plating process"), a process of immersing an obtained stacked film 50 in a second plating bath containing the Sm source and the Co source and forming a non-oriented $SmCo_5$ film at least on a main surface opposite to the main surface that is in contact with the Mo substrate 10 in the $Sm_2Co_{17}$ film by an electrolytic plating method (hereinafter, also referred to as "second electrolytic plating process"), and a process of heating an obtained alloy film. In the method, a molar ratio of the Co source to the Sm source in the second plating bath is smaller than a molar ratio of the Co source to the Sm source in the first plating bath.

(First and Second Electrolytic Plating Processes)

Figure 6:
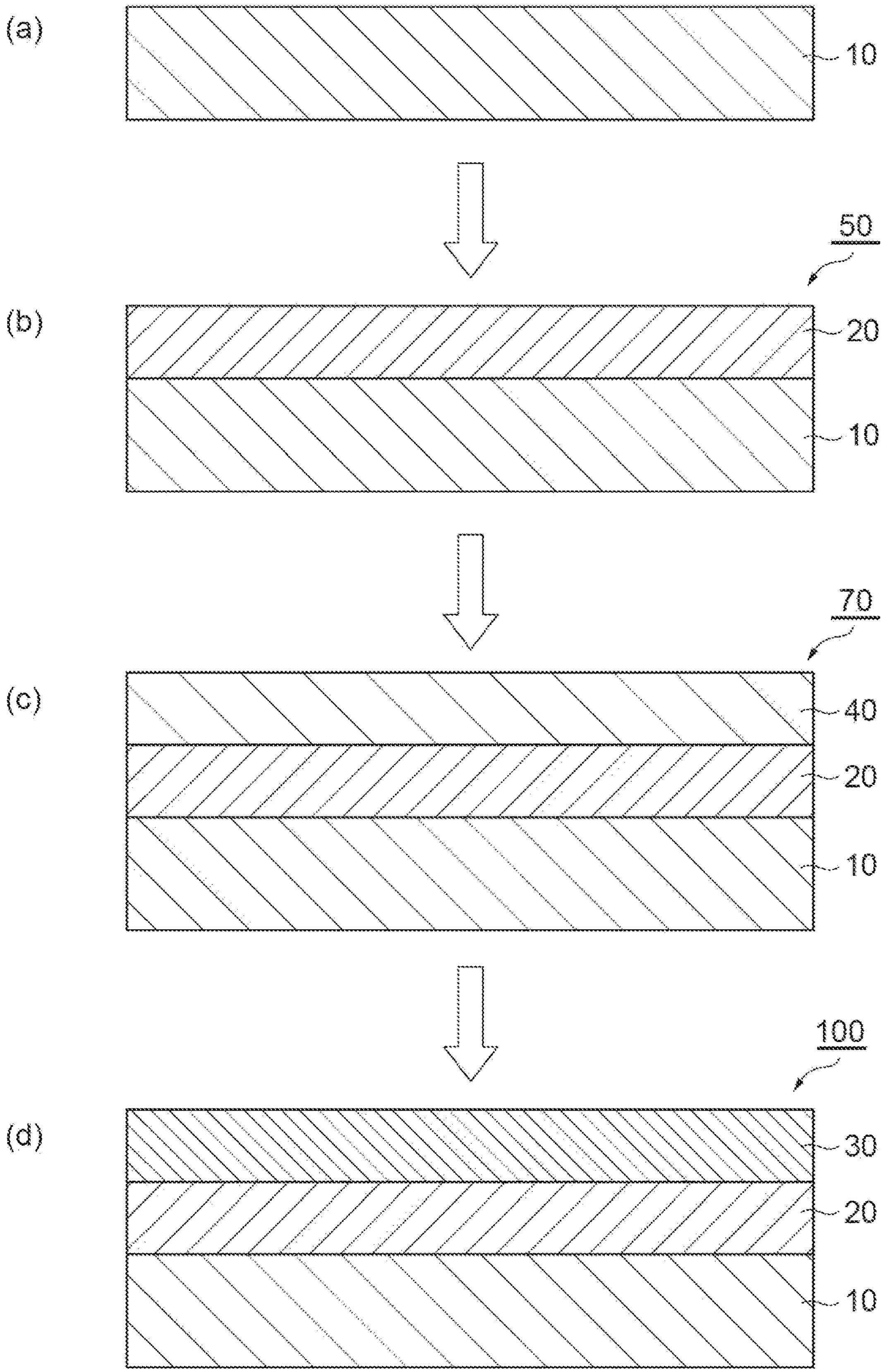
FIG. 6 is a schematic cross-sectional view of a method of manufacturing the SmCo-based magnet film according to the embodiment of the invention.

FIG. 6 is a schematic cross-sectional view of the method of manufacturing the SmCo-based magnet film according to an embodiment. In the first electrolytic plating process, the $Sm_2Co_{17}$ film 20 is formed on a main surface of the Mo substrate 10 illustrated in FIG. 6(*a*) by an electrolytic plating method, and the stacked film 50 including the Mo substrate 10 and the $Sm_2Co_{17}$ film 20 as illustrated in FIG. 6(*b*) is obtained. In FIG. 6(*b*), the $Sm_2Co_{17}$ film is illustrated on only one main surface of the Mo substrate 10, but the $Sm_2Co_{17}$ film may be formed on the other main surface of the Mo substrate 10 and a side surface of the Mo substrate 10.

In the second electrolytic plating process, a non-oriented $SmCo_5$ film is formed on at least a main surface opposite to the main surface that is in contact with the Mo substrate 10 in the $Sm_2Co_{17}$ film. According to this, an alloy film 70 including the Mo substrate 10, the $Sm_2Co_{17}$ film 20, and a non-oriented $SmCo_5$ film 40 in this order as illustrated in FIG. 6(*c*) is obtained. In FIG. 6(*c*), the non-oriented $SmCo_5$ film is illustrated only on the main surface opposite to the main surface that is in contact with the Mo substrate 10 in the $Sm_5Co_{17}$ film, but the non-oriented $SmCo_5$ film may be formed on the other main surface of the Mo substrate 10 and a side surface of the Mo substrate 10.

In the first electrolytic plating process, the Mo substrate 10 is immersed in a plating bath containing an Sm source and a Co source, the Mo substrate 10 is set as a cathode, and a current is caused to flow between the cathode and an anode. Accordingly, Sm ions and Co ions reductively precipitate on the main surface of the Mo substrate 10, and the $Sm_2Co_{17}$ film 20 is formed on the main surface of the Mo substrate 10.

In the second electrolytic plating process, the stacked film 50 is immersed in a plating bath containing the Sm source and the Co source, the stacked film 50 is set as a cathode, and a current is caused to flow between the cathode and an anode. According to this, Sm ions and Co ions reductively precipitate on the main surface of the $Sm_2Co_{17}$ film 20, and the non-oriented $SmCo_5$ film 40 is formed on the main surface of the $Sm_2Co_{17}$ film 20.

The plating bath in the first and second electrolytic plating processes may be a molten salt of the Sm source, the Co source, and an inorganic salt other than the Sm source.

Examples of the Sm source include $SmCl_3$ and $SmF_3$. Examples of the Co source include $CoCl_2$ and $CoF_2$. With regard to the Sm source and the Co source, one kind may be used alone or two or more kinds may be used in combination.

Examples of an inorganic salt other than the Sm source and the Co source include KCl, LiCl, and NaCl. With regard to the inorganic salts, one kind can be used alone, or two or more kinds can be used in combination.

The molar ratio of the Co source to the Sm source in the first electrolytic plating process may be 1.3 or more, and preferably 1.4 or more from the viewpoint of efficiently forming the $Sm_2Co_{17}$ film 20. The molar ratio of the Co source to the Sm source in the first electrolytic plating process may be 1.5 or less.

The molar ratio of the Co source to the Sm source in the second electrolytic plating process may be 1.1 or less, and preferably 1.0 or less from the viewpoint of efficiently forming the $SmCo_5$ film 40. The molar ratio of the Co source to the Sm source in the second electrolytic plating process may be 0.9 or more.

A ratio of the Sm source to the Sm source, the Co source, and the inorganic salt other than the Sm source and the Co source may be, for example, 0.05 to 2 mol % on the basis of the sum of the number of moles of the Sm source and the Co source contained in the plating bath, and the number of moles of the inorganic salt, which is contained in the plating bath, other than the Sm source and the Co source. A ratio of the Co source to the Sm source, the Co source, and the inorganic salt other than the Sm source and the Co source may be, for example, 0.025 to 1 mol % on the basis of the sum of the number of moles of the Sm source and the Co source contained in the plating bath, and the number of moles of the inorganic salt, which is contained in the plating bath, other than the Sm source and the Co source.

For example, the plating bath may be adjusted by drying the inorganic salt for dehydration, heating the inorganic slat to a plating temperature to be described later to melt the inorganic salt, and adding the Sm source and the Co source to the molten inorganic salt.

A material of the anode that is used in the first and second electrolytic plating process is not particularly limited as long as the material is used as the anode in electrolytic plating, and examples thereof include graphite, glassy carbon, and Mo. A shape of the anode is not particularly limited, and may be, for example, a rectangular parallelepiped shape. In a case where the anode has the rectangular parallelepiped shape, the thickness of the anode may be, for example, 0.1 to 10 mm, a length in a long side direction may be, for example, 10 to 100 mm, and a length in a short side direction may be, for example, 1 to 50 mm.

A plating temperature in the first and the second electrolytic plating processes is not particularly limited as long as the temperature is equal to or higher than a melting temperature of the inorganic salt, and from the viewpoint that the $Sm_2Co_{17}$ film 20 and the non-oriented $SmCo_5$ film 40 are efficiently formed, the plating temperature is preferably 400° C. or higher, more preferably 500° C. or higher, and still more preferably 600° C. or higher. Here, the plating temperature represents a temperature of the plating bath during plating.

An electrolysis type of the first and second electrolytic plating processes may be a constant current. From the viewpoint that the $Sm_2Co_{17}$ film 20 and the non-oriented $SmCo_5$ film 40 are efficiently formed, a current value in the electrolytic plating processes is preferably 0.05 A or more, more preferably 0.1 A or more, and still more preferably 0.2 A or more.

A plating time in the first and second electrolytic plating processes can be appropriately changed in correspondence with the current value as long as the $Sm_2Co_{17}$ film 20 and the non-oriented $SmCo_5$ film 40 can be formed in a desired thickness. It is not necessary to set the plating time to be longer than necessary from the viewpoint of efficiency, and the plating time may be, for example, 1 to 60 minutes.

It is preferable that the $Sm_2Co_{17}$ film 20 contains $Sm_2Co_{17}$ as a main phase. The $Sm_2Co_{17}$ film 20 may include a crystal phase (different phase) different from the main phase or a grain boundary. For example, a ratio of the main phase may be 50% by mass or more, 70% by mass or more, or 90% by mass or more. Examples of the different phase include an Sm-rich phase in which a content ratio of Sm is higher in comparison to $Sm_2Co_{17}$.

It is preferable that the non-oriented $SmCo_5$ film 40 contains $SmCo_5$ as a main phase. The non-oriented $SmCo_5$ film 40 may include a crystal phase (different phase) different from the main phase or a grain boundary. For example, a ratio of the main phase may be 50% by mass or more, 70% by mass or more, or 90% by mass or more. Examples of the different phase include an Sm-rich phase in which a content ratio of Sm is higher in comparison to $SmCo_5$.

The obtained alloy film 70 may be washed before a heating process to be described later. A washing method is not particularly limited, and examples thereof include an organic solvent such as ethanol and water.

(Heating Process)

In the heating process, the alloy film 70 is heated until reaching a holding temperature, the alloy film 70 is heated at the holding temperature while applying a magnet filed in a direction perpendicular to a main surface of the alloy film 70, and the alloy film 70 is cooled down while applying a magnetic field in a direction perpendicular to the main surface of the alloy film 70. According to this, the orientation of the crystal orientation [00L] of the non-oriented $SmCo_5$ film 40 varies, and the $SmCo_5$ film 30 in which the crystal orientation [00L] is oriented in a thickness direction of the $SmCo_5$ film is formed from the non-oriented $SmCo_5$ film 40.

A temperature-rising rate in the heating process is not particularly limited, and may be, for example, 0.1 to 100° C./second. From the viewpoint that the surface magnetic flux density of the magnet film 100 is further improved, the holding temperature is preferably 800° C. or higher, more preferably 850° C. or higher, and still more preferably 900° C. or higher. From the viewpoint that the surface magnetic flux density of the magnet film 100 is further improved, a temperature-dropping rate is preferably 5° C./second or more, more preferably 10° C./second or more, and still more preferably 20° C./second or more. The applied magnet field during the temperature holding process and the cooling process is not particularly limited, and may be, for example, 2 to 3 T.

From the viewpoint that a decrease in the surface magnetic flux density of the $SmCo_5$ film 30 is further suppressed, a holding time in the heating process is preferably 60 seconds or shorter, more preferably 30 seconds or shorter, and still more preferably 15 seconds or shorter.

An atmosphere in the heating process is not particularly limited, but an inert gas atmosphere is preferable from the viewpoint of suppressing oxidization, and examples of the inert gas include Ar and $N_2$.

SECOND EMBODIMENT

A method of manufacturing an SmCo-based magnet film according to another embodiment will be described. For example, the method of manufacturing the SmCo-based magnet film according to this embodiment may be a method including an electrolytic plating process of immersing a Co substrate 12 in a plating bath containing an Sm source to form an $SmCo_2$ film 25 on at least one main surface of the Co substrate 12 by an electrolytic plating method, and a process of heating an obtained stacked film 51.

Figure 7:
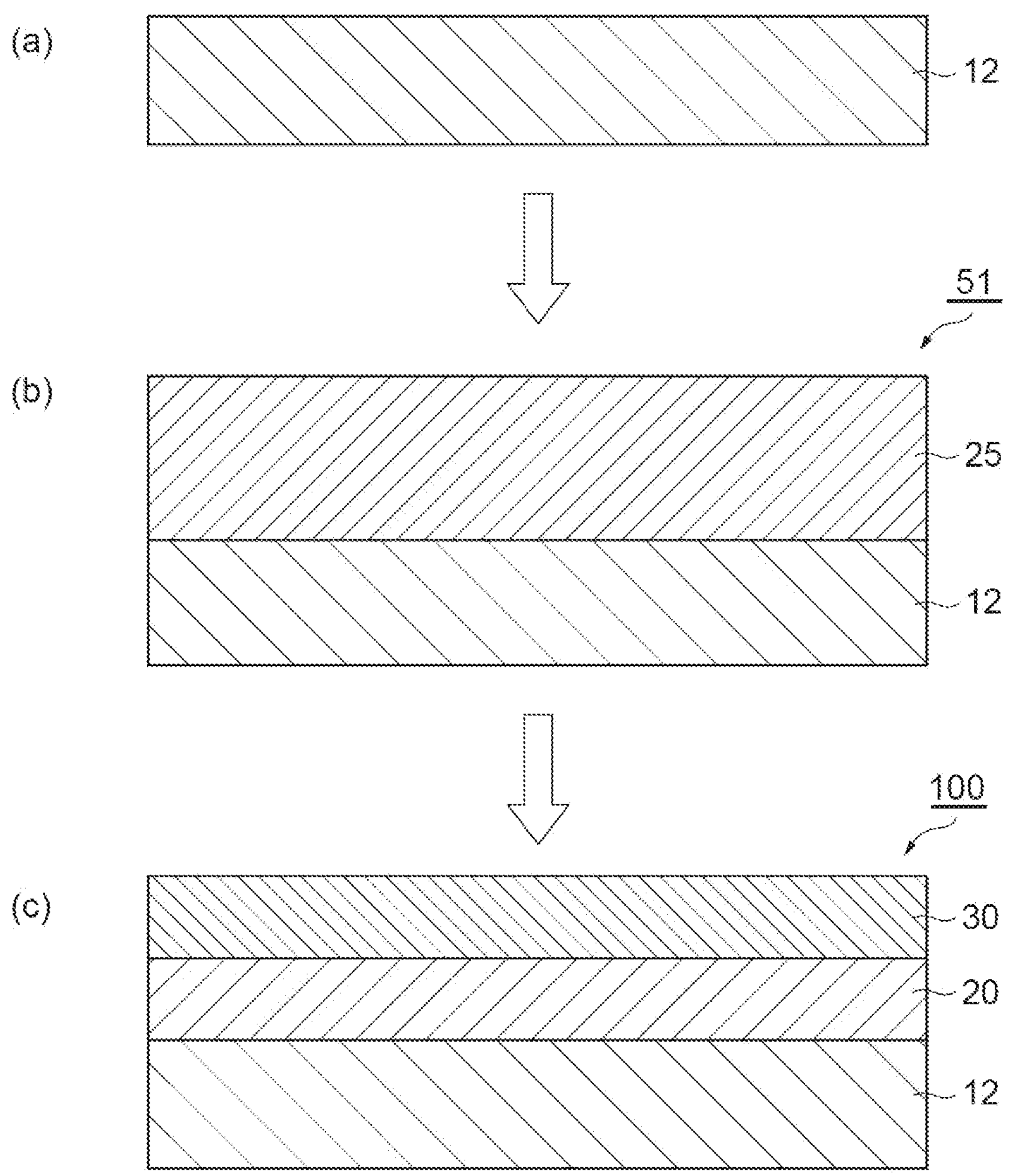
FIG. 7 is a schematic cross-sectional view of a method of manufacturing an SmCo-based magnet film according to an embodiment of the invention.

FIG. 7 is a schematic cross-sectional view of a method of manufacturing an SmCo-based magnet film according to an embodiment. In an electrolytic plating process, the $SmCo_2$ film 25 is formed on a main surface of the Co substrate 12 illustrated in FIG. 7(*a*) by an electrolytic plating method to obtain the stacked film 51 including the Co substrate 12 and the $SmCo_2$ film 25 as illustrated in FIG. 7(*b*).

It is preferable that the $SmCo_2$ film 25 includes $SmCo_2$ as a main phase. $SmCo_2$ is an alloy of Sm and Co which has an $MgCu_2$ type crystal structure. A ratio between Sm atoms and Co atoms in $SmCo_2$ may deviate from a stoichiometric ratio. The ratio between the Sm atoms and the Co atoms in $SmCo_2$ may not be the stoichiometric ratio when adding various elements, for example, for improvement and the like of magnetic characteristics. Therefore, as long as $SmCo_2$ has the $MgCu_2$ type crystal structure, the ratio between the Sm atoms and the Co atoms may deviate from the stoichiometric ratio.

The $SmCo_2$ film 25 may include a crystal phase (different phase) different from the main phase or a grain boundary. For example, a ratio of the main phase may be 50% by mass or more, 70% by mass or more, or 90% by mass or more. Examples of the different phase include an Sm-rich phase in which a content ratio of Sm is higher in comparison to $SmCo_2$.

In FIG. 7(*b*), the $SmCo_2$ film 25 is illustrated on only one main surface of the Co substrate 12, but the $SmCo_2$ film 25 may be formed on the other main surface of the Co substrate 12 and a side surface of the Co substrate 12.

In the electrolytic plating process, the Co substrate 12 is immersed in a plating bath containing an Sm source, the Co substrate 12 is set as a cathode, and a current is caused to flow between the cathode and an anode. Accordingly, Sm ions reductively precipitate on the main surface of the Co substrate 12, and the $SmCo_2$ film 25 is formed on the main surface of the Co substrate 12.

The plating bath in the electrolytic plating process may be a molten salt of the Sm source and an inorganic salt other than the Sm source.

As the Sm source and the inorganic salt other than the Sm source, a similar Sm source and a similar inorganic salt other than the Sm source as in the method of manufacturing the SmCo-based magnet film according to the first embodiment can be used.

A ratio of the Sm source in the Sm source and the inorganic salt other than the Sm source may be, for example, 0.05 to 2 mol % on the basis of the sum of the number of moles of the Sm source contained in the plating bath and the number of moles the inorganic salt, which is contained in the plating bath, other than the Sm source.

For example, the plating bath may be adjusted by drying the inorganic salt for dehydration, heating the inorganic slat to a plating temperature to be described later to melt the inorganic salt, and adding the Sm source to the molten inorganic salt.

A material and a shape of the anode that is used in the electrolytic plating process may be similar as in the method of manufacturing the SmCo-based magnet film according to the first embodiment.

The plating temperature in the electrolytic plating process is not particularly limited as long as the plating temperature is equal to or higher than a melting temperature of the inorganic salt, and from the viewpoint of efficiently forming the $SmCo_2$ film 25, the plating temperature is preferably 400° C. or higher, more preferably 500° C. or higher, and still more preferably 600° C. or higher. Here, the plating temperature represents a temperature of the plating bath during plating.

An electrolysis type of the electrolytic plating process may be a constant current. A current value in the electrolytic plating process may be similar as in the electrolytic plating process in the method of manufacturing the SmCo-based magnet film according to the first embodiment.

A plating time in the electrolytic plating process can be appropriately changed in correspondence with the current value as long as the $SmCo_2$ film 25 can be formed in a desired thickness. It is not necessary to set the plating time to be longer than necessary from the viewpoint of efficiency, and the plating time may be, for example, 1 to 120 minutes.

The obtained stacked film 51 may be washed before a heating process to be described later. A washing method is not particularly limited, and examples thereof include an organic solvent such as ethanol and water.

(Heating Process)

In a heating process, the stacked film 51 is heated until reaching a holding temperature, and is cooled down. According to this, $SmCo_2$ and Co react with each other, and the $Sm_2Co_{17}$ film 20 and the $SmCo_5$ film 30 in which the crystal orientation [00L] is oriented in a thickness direction of the $SmCo_5$ film are formed from the Co substrate 12 and the $SmCo_2$ film 25.

A temperature-rising rate, a holding temperature, and a temperature-dropping rate in the heating process may be similar as in the heating process in the method of manufacturing the SmCo-based magnet film according to the first embodiment.

The holding time in the heating process may be one hour or longer, and 36 hours or shorter.

An atmosphere in the heating process may be similar as in the method of manufacturing the SmCo-based magnet film according to the first embodiment.

The magnet film can be used such as in an MEMS device that is an actuator for driving of a lens of a smartphone, and the like.

<Method of Manufacturing Cylindrical SmCo-based Magnet>

A method of manufacturing a cylindrical SmCo-based magnet according to an embodiment will be described in detail. For example, the method of manufacturing the cylindrical SmCo-based magnet according to this embodiment may be a method including a reaction diffusion process of immersing a Co base material 12 in a bath containing an Sm source to form an $SmCo_2$ film 25 on the Co base material 12 by reaction diffusion, and a process of heating an obtained stacked body 52.

Figure 8:
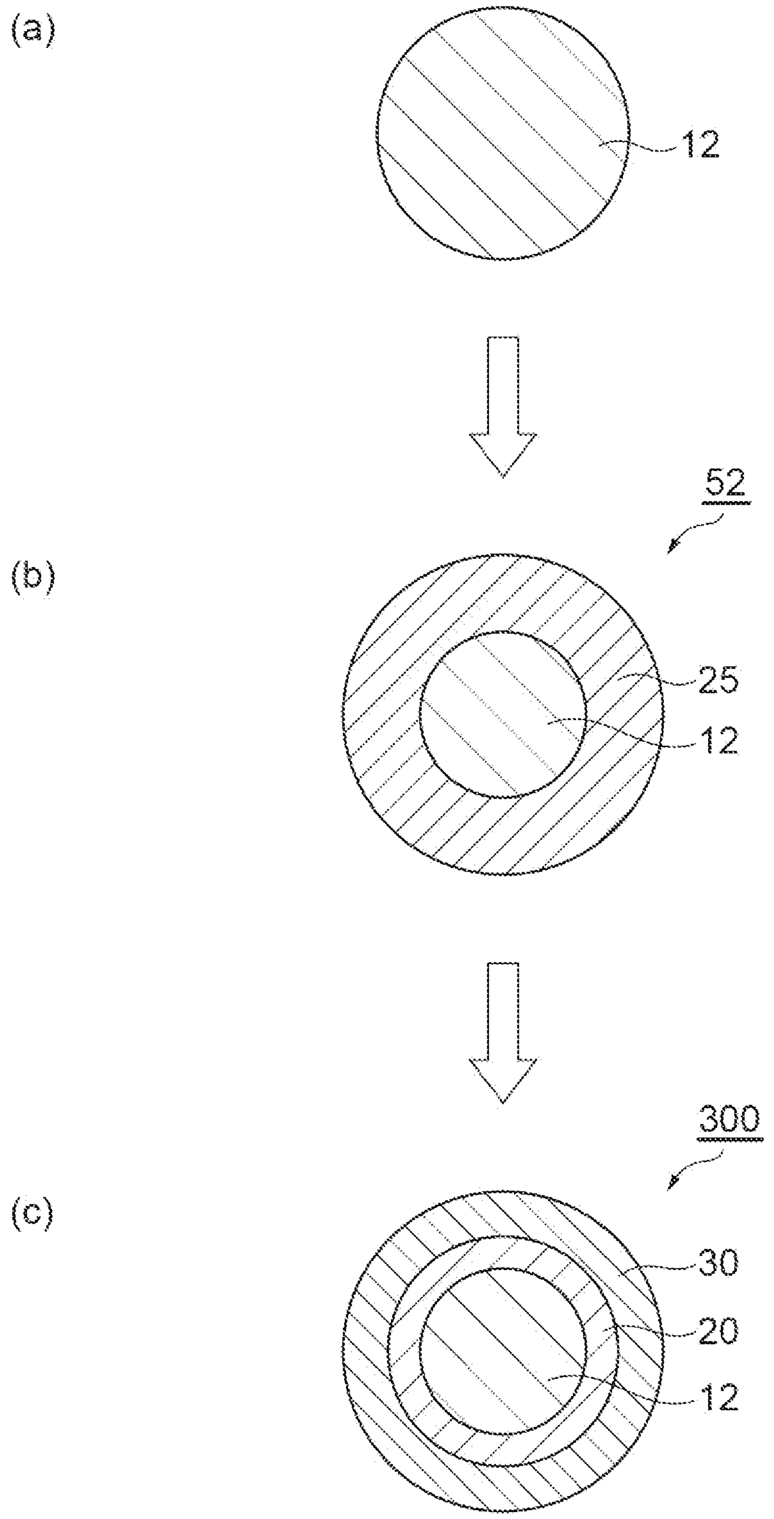
FIG. 8 is a schematic cross-sectional view of a method of manufacturing an SmCo-based magnet according to an embodiment of the invention.

FIG. 8 is a schematic cross-sectional view of the method of manufacturing the cylindrical SmCo-based magnet according to the embodiment. In the reaction diffusion process, the $SmCo_2$ film 25 is formed on the Co base material 12 illustrated in FIG. 8(*a*) through reaction diffusion, and the stacked body 52 including the Co base material 12 and the $SmCo_2$ film 25 as illustrated in FIG. 8(*b*) is obtained.

It is preferable that the $SmCo_2$ film 25 contains $SmCo_2$ as a main phase. $SmCo_2$ is an alloy of Sm and Co which has an $MgCu_2$ type crystal structure. A ratio between Sm atoms and Co atoms in $SmCo_2$ may deviate from a stoichiometric ratio. For example, the ratio between the Sm atoms and the Co atoms in $SmCo_2$ may not be the stoichiometric ratio when adding various elements, for example, for improvement and the like of magnetic characteristics. Therefore, as long as $SmCo_2$ has the $MgCu_2$ type crystal structure, the ratio between the Sm atoms and the Co atoms may deviate from the stoichiometric ratio.

The $SmCo_2$ film 25 may include a crystal phase (different phase) different from the main phase, or a grain boundary. For example, a ratio of the main phase may be 50% by mass or more, 70% by mass or more, or 90% by mass or more. Examples of the different phase include an Sm-rich phase in which a content ratio of Sm is higher in comparison to $SmCo_2$.

In the reaction diffusion process, when the Co base material 12 is immersed in a bath containing an Sm source, reaction diffusion occurs between the Sm source that diffuses in the bath and the Co base material 12 on a main surface of the Co base material 12, and the $SmCo_2$ film 25 is formed on the Co base material 12.

The bath in the reaction diffusion process may be a molten salt of the Sm source and an inorganic salt other than Sm source.

Examples of the Sm source include metal Sm and an Sm alloy. With regard to the Sm source, one kind can be used alone, or two or more kinds can be used in combination.

Examples of the inorganic salt other than the Sm source include KCl, LiCl, and NaCl. With regard to the inorganic salts, one kind can be used alone, or two or more kinds can be used in combination.

A ratio of the Sm source in the Sm source and the inorganic salt other than the Sm source may be, for example, 1 to 6 mol % on the basis of the sum of the number of moles of the Sm source contained in the bath and the number of moles the inorganic salt, which is contained in the bath, other than the Sm source.

For example, the bath may be adjusted by drying the inorganic salt for dehydration, heating the inorganic slat to a reaction diffusion temperature to be described later to melt the inorganic salt, and adding the Sm source to the molten inorganic salt.

The plating temperature in the reaction diffusion process is not particularly limited as long as the reaction diffusion temperature is equal to or higher than a melting temperature of the inorganic salt, and from the viewpoint of efficiently forming the $SmCo_2$ film 25, the reaction diffusion temperature is preferably 400° C. or higher, more preferably 500° C. or higher, and still more preferably 600° C. or higher. Here, the reaction diffusion temperature represents a temperature of the bath during reaction diffusion.

A reaction diffusion time in the reaction diffusion process can be appropriately changed in correspondence with the reaction diffusion temperature and a molar concentration of the Sm source in the bath as long as the $SmCo_2$ film 25 can be formed in a desired thickness. It is not necessary to set the reaction diffusion time to be longer than necessary from the viewpoint of efficiency, and the reaction diffusion time may be, for example, 1 to 48 hours.

The obtained stacked body 52 may be washed before a heating process to be described later. A washing method is not particularly limited, and examples thereof include an organic solvent such as ethanol and water.

(Heating Process)

In a heating process, the stacked body 52 is heated until reaching a holding temperature, and is cooled down. According to this, $SmCo_2$ and Co react with each other, and the $Sm_2Co_{17}$ film 20 and the $SmCo_5$ film 30 in which the crystal orientation [00L] is radially oriented are formed from the Co base material 12 and the $SmCo_2$ film 25.

A temperature-rising rate in the heating process is not particularly limited, and may be, for example, 0.1 to 100°

C./second. From the viewpoint that a surface magnetic flux density of a magnet 300 is further improved, a holding temperature is preferably 800° C. or higher, more preferably 850° C. or higher, and still more preferably 900° C. or higher. From the viewpoint that the surface magnetic flux density of the magnet 300 is further improved, a temperature-dropping rate is preferably 5° C./second or more, more preferably 10° C./second or more, and still more preferably 20° C./second or more.

The holding time in the heating process may be 6 hours or longer, and 36 hours or shorter.

An atmosphere in the heating process is not particularly limited, but an inert gas atmosphere is preferable from the viewpoint of suppressing oxidization, and examples of the inert gas include Ar and Nz.

EXAMPLES

Hereinafter, the invention will be described in more detail with reference to examples, but the invention is not limited to the following examples.

<Manufacturing of SmCo-based Magnet Film>

Example 1

(First Electrolytic Plating Process)

KCl and LiCl were mixed in a molar ratio of KCl: LiCl=41.5:58.5, thereby obtaining a mixture. The obtained mixture was dried for dehydration. A temperature of the mixture after dehydration was raised to 650° C. in a ceramic container by an external heater, thereby melting the mixture. $SmCl_3$ and $CoCl_2$ were added to the molten mixture as the Sm source and the Co source. Addition of the Sm source and the Co source was performed so that a molar ratio of KCl and LiCl, $SmCl_3$, and $CoCl_2$ becomes KCl and LiCl:$SmCl_3$:$CoCl_2$=100.0:0.5:0.7. Next, an Mo substrate having a thickness of 0.5 mm as a cathode, and a graphite plate having a thickness of 1 mm as an anode were prepared. The Mo substrate was washed with acetone in advance. The Mo substrate and the graphite plate were immersed in the molten mixture, and first electrolytic plating was performed with respect to the Mo substrate by an electrolytic plating method. Plating was performed under conditions of constant current electrolysis, a plating temperature of 650° C., a current of 0.5 A, and a plating time of 5 minutes. A stacked film in which the $Sm_2Co_{17}$ film was formed on the Mo substrate was obtained by the first electrolytic plating process.

(Second Electrolytic Plating Process)

A mixture of KCl and LiCl was melted in a similar manner as in the first electrolytic plating process. $SmCl_3$ and $CoCl_2$ were added to the molten mixture as the Sm source and the Co source. Addition of the Sm source and the Co source was performed so that a molar ratio of KCl and LiCl, $SmCl_3$, and $CoCl_2$ becomes KCl and LiCl:$SmCl_3$:$CoCl_2$=100.0:0.5:0.4. Next, a graphite plate having a thickness of 1 mm was prepared as an anode. The stacked film obtained in the first electrolytic plating process was set as a cathode. The stacked film and the graphite film were immersed in the molten mixture, and second electrolytic plating was performed with respect to the stacked film by an electrolytic plating method. Plating was performed under conditions of constant current electrolysis, a plating temperature of 650° C., a current of 0.5 A, and a plating time of 5 minutes. An alloy film, in which a non-oriented $SmCo_5$ film was formed on a main surface opposite to a main surface that is in contact with the Mo substrate 10 in the $Sm_2Co_{17}$ film by an electrolytic plating method, was obtained.

(Heating Process)

A temperature of the obtained alloy film was raised until reaching 900° C. Then, the alloy film was heated at a holding temperature of 900° C. for 5 seconds while applying a magnetic field of 3 T in a direction perpendicular to the alloy film. Then, the alloy film was cooled down while applying a magnetic field of 3 T in a direction perpendicular to the alloy film, thereby obtaining the SmCo-based magnet film. A temperature-rising rate was set to 100° C./second, and A temperature-dropping rate was set to 20° C./second. An atmosphere in the heating process was set to Ar. It was confirmed by an X-ray diffraction measuring device and an energy dispersive X-ray analyzing device that the obtained SmCo-based magnet film has a structure in which the $Sm_2Co_{17}$ film and the $SmCo_5$ film were formed on the Mo substrate in this order.

Example 2

An SmCo-based magnet film was obtained in a similar manner as in Example 1 except that the $Sm_2Co_{17}$ film was formed by setting the plating time in the first electrolytic plating process to 3 minutes, and the non-oriented $SmCo_5$ film was formed by setting the plating time in the second plating process to 15 minutes. It was confirmed by an X-ray diffraction measuring device and an energy dispersive X-ray analyzing device that the obtained SmCo-based magnet film has a structure in which the $Sm_2Co_{17}$ film and the $SmCo_5$ film were formed on the Mo substrate in this order.

Example 3

(Electrolytic Plating Process)

KCl and LiCl were mixed in a molar ratio of KCl: LiCl=41.5:58.5, thereby obtaining a mixture. The obtained mixture was dried for dehydration. A temperature of the mixture after dehydration was raised to 700° C. in a ceramic container by an external heater, thereby melting the mixture. $SmCl_3$ was added to the molten mixture as the Sm source. Addition of the Sm source was performed so that a molar ratio of KCl and LiCl, and $SmCl_3$ becomes KCl and LiCl: $SmCl_3$=100.0:0.5. Next, a Co substrate having a thickness of 0.5 mm as a cathode, and a graphite plate having a thickness of 1 mm as an anode were prepared. The Co substrate was washed with acetone in advance. The Co substrate and the graphite plate were immersed in the molten mixture, and electrolytic plating was performed with respect to the Co substrate by an electrolytic plating method. Plating was performed under conditions of constant current electrolysis, a plating temperature of 700° C., a current of 0.5 A, and a plating time of 10 minutes. A stacked film in which the $SmCo_2$ film was formed on the Co substrate was obtained by the electrolytic plating process.

(Heating Process)

A temperature of the obtained stacked film was raised until reaching 900° C. Then, the stacked film was heated at a holding temperature of 900° C. for 21600 seconds without applying a magnet field to the stacked film. Then, the stacked film was cooled down without applying a magnetic field to the stacked film, thereby obtaining an SmCo-based magnet film. A temperature-rising rate was set to 0.15° C./second, and a temperature-dropping rate was set to 20° C./second. An atmosphere in the heating process was set to Ar. It was confirmed by an X-ray diffraction measuring device and an energy dispersive X-ray analyzing device that the obtained SmCo-based magnet film has a structure in which the $Sm_2Co_{17}$ film and the $SmCo_5$ film were formed on the Co substrate in this order.

Examples 4, 6, 7, and 9

A stacked film was obtained in a similar manner as in Example 3 except that the amount of $SmCl_3$ added to totally 100 parts by mole of KCl and LiCl, a temperature for melting KCl and LiCl, a plating temperature, a current, and a plating time in the electrolytic plating process were set to values shown in Table 1. An SmCo-based magnet film was obtained in a similar manner as in Example 3 except that the temperature-rising rate, the holding temperature, the holding time, and the temperature-dropping rate in the heating process were set to values shown in Table 3. It was confirmed by an X-ray diffraction measuring device and an energy dispersive X-ray analyzing device that the obtained SmCo-based magnet film has a structure in which the $Sm_2Co_{17}$ film and the $SmCo_5$ film were formed on the Co substrate in this order.

Examples 5 and 8

A stacked film in which an $Sm_2Co_{17}$ film was formed on an Mo substrate was obtained in a similar manner as in Example 1 except that the plating time in the first electrolytic plating process was set to a value shown in Table 1. An alloy film in which a non-oriented $SmCo_5$ film was formed on a main surface opposite to a main surface that is in contact with the Mo substrate in the $Sm_2Co_{17}$ film was obtained in a similar manner as in Example 1 except that the amount of $SmCl_3$ and $CoCl_2$ added to totally 100 parts by mole of KCl and LiCl, a temperature for melting KCl and LiCl, a plating temperature, a current, and a plating time in the second electrolytic plating process were set to values shown in Table 2. An SmCo-based magnet film was obtained in a similar manner as in Example 1 except that the holding time in the heating process was set to a value shown in Table 3. It was confirmed by an X-ray diffraction measuring device and an energy dispersive X-ray analyzing device that the obtained SmCo-based magnet film has a structure in which the $Sm_2Co_{17}$ film and the $SmCo_5$ film were formed on the Mo substrate in this order.

Comparative Example 1

(Electrolytic Plating Process)

KCl and LiCl were mixed in a molar ratio of KCl:LiCl=41.5:58.5, thereby obtaining a mixture. The obtained mixture was dried for dehydration. A temperature of the mixture after dehydration was raised to 650° C. in a ceramic container by an external heater, thereby melting the mixture. $SmCl_3$ and $CoCl_2$ were added to the molten mixture as the Sm source and the Co source. Addition of the Sm source and the Co source was performed so that a molar ratio of KCl and LiCl, $SmCl_3$, and $CoCl_2$ becomes KCl and LiCl:$SmCl_3$:$CoCl_2$=100.0:0.5:0.4. Next, an Mo substrate having a thickness of 0.5 mm as a cathode, and a graphite plate having a thickness of 1 mm as an anode were prepared. The Mo substrate was washed with acetone in advance. The Mo substrate and the graphite plate were immersed in the molten mixture, and electrolytic plating was performed with respect to the Mo substrate by an electrolytic plating method. Plating was performed under conditions of constant current electrolysis, a plating temperature of 650° C., a current of 0.5 A, and a plating time of 5 minutes. A stacked film in which a non-oriented $SmCo_5$ film was formed on the Mo substrate was obtained by the electrolytic plating process.

(Heating Process)

A temperature of the obtained stacked film was raised until reaching 700° C. Then, the stacked film was heated at a holding temperature of 700° C. for 5 seconds without applying a magnet field to the stacked film. Then, the stacked film was cooled down without applying a magnetic field to the stacked film, thereby obtaining an SmCo-based magnet film. A temperature-rising rate was set to 0.1° C./second, and a temperature-dropping rate was set to 0.5° C./second. An atmosphere in the heating process was set to Ar. It was confirmed by an X-ray diffraction measuring device and an energy dispersive X-ray analyzing device that the obtained SmCo-based magnet film has a structure in which the non-oriented $SmCo_5$ film was formed on the Mo substrate.

Comparative Example 2

An SmCo-based magnet film was obtained in a similar manner as in Comparative Example 1 except that the plating time in the electrolytic plating process was set to 15 minutes. It was confirmed by an X-ray diffraction measuring device and an energy dispersive X-ray analyzing device that the obtained SmCo-based magnet film has a structure in which the non-oriented $SmCo_5$ film was formed on the Mo substrate.

Comparative Example 3

A stacked film was obtained in a similar manner as in Example 1 except that the plating time in the first electrolytic plating process was set to a value shown in Table 1. A temperature of the obtained stacked film was raised until reaching 700° C. Next, an alloy film was heated at a holding temperature of 700° C. for 5 seconds without applying a magnet field to the alloy film. Then, the alloy film was cooled down without applying a magnetic field to the alloy film, thereby obtaining an SmCo-based magnet film. A temperature rising rate was set to 0.1° C./second and a temperature-dropping rate was set to 0.5° C./second. An atmosphere in the heating process was set to Ar. It is confirmed by an X-ray diffraction measuring device and an energy dispersive X-ray analyzing device that the obtained SmCo-based magnet film has a structure in which $Sm_2Co_{17}$ was formed on the Mo substrate.

Comparative Example 4

An SmCo-based magnet film was obtained in a similar manner as in Comparative Example 1 except that the plating time in the electrolytic plating process was set to a value shown in Table 2. It is confirmed by an X-ray diffraction measuring device and an energy dispersive X-ray analyzing device that the obtained SmCo-based magnet film has a structure in which the non-oriented $SmCo_5$ film was formed on the Mo substrate.

TABLE 1

| | Addition amount with respect to totally 100 parts by mole of KCl and LiCl [parts by mole] | | Melting temperature | Kind of | Plating temperature | Current | Plating time |
|---|---|---|---|---|---|---|---|
| | $SmCl_3$ | $CoCl_2$ | [° C.] | Cathode | [° C.] | [A] | [minute] |
| Example 1 | 0.5 | 0.7 | 650 | Mo | 650 | 0.5 | 5 |
| Example 2 | 0.5 | 0.7 | 650 | Mo | 650 | 0.5 | 3 |
| Example 3 | 0.5 | — | 700 | Co | 700 | 0.5 | 10 |
| Example 4 | 0.75 | — | 700 | Co | 700 | 0.75 | 30 |
| Example 5 | 0.5 | 0.7 | 650 | Mo | 650 | 0.5 | 10 |
| Example 6 | 1.5 | — | 700 | Co | 700 | 1 | 55 |
| Example 7 | 1.5 | — | 700 | Co | 700 | 1 | 80 |
| Example 8 | 0.5 | 0.7 | 650 | Mo | 650 | 0.5 | 3 |
| Example 9 | 1.5 | — | 700 | Co | 700 | 1 | 100 |
| Comparative Example 3 | 0.5 | 0.7 | 650 | Mo | 650 | 0.5 | 2 |

TABLE 2

| | Addition amount with respect to totally 100 parts by mole of KCl and LiCl [parts by mole] | | Melting temperature | Plating temperature | Current | Plating time |
|---|---|---|---|---|---|---|
| | $SmCl_3$ | $CoCl_2$ | [° C.] | [° C.] | [A] | [minute] |
| Example 1 | 0.5 | 0.4 | 650 | 650 | 0.5 | 5 |
| Example 2 | 0.5 | 0.4 | 650 | 650 | 0.5 | 15 |
| Example 5 | 0.75 | 0.6 | 700 | 700 | 0.75 | 40 |
| Example 8 | 1.0 | 0.8 | 700 | 700 | 1.0 | 90 |
| Comparative Example 1 | 0.5 | 0.4 | 650 | 650 | 0.5 | 5 |
| Comparative Example 2 | 0.5 | 0.4 | 650 | 650 | 0.5 | 15 |
| Comparative Example 4 | 0.5 | 0.4 | 650 | 650 | 0.5 | 2 |

TABLE 3

| | Temperature-rising rate [° C./second] | Holding temperature [° C.] | Holding time [second] | Application magnetic field [T] | Temperature-dropping rate [° C./second] |
|---|---|---|---|---|---|
| Example 1 | 100 | 900 | 5 | 3 | 20 |
| Example 2 | 100 | 900 | 5 | 3 | 20 |
| Example 3 | 0.15 | 900 | 21600 | — | 20 |
| Example 4 | 0.15 | 1000 | 21600 | — | 20 |
| Example 5 | 100 | 900 | 10 | 3 | 20 |
| Example 6 | 0.15 | 1000 | 43200 | — | 20 |
| Example 7 | 0.15 | 1000 | 86400 | — | 20 |
| Example 8 | 100 | 900 | 10 | 3 | 20 |
| Example 9 | 0.15 | 1050 | 86400 | — | 20 |
| Comparative Example 1 | 0.1 | 700 | 5 | — | 0.5 |
| Comparative Example 2 | 0.1 | 700 | 5 | — | 0.5 |
| Comparative Example 3 | 0.1 | 700 | 5 | — | 0.5 |
| Comparative Example 4 | 0.1 | 700 | 5 | — | 0.5 |

<Manufacturing of Cylindrical SmCo-based Magnet>

Example 10

(Reaction Diffusion Process)

LiCl was prepared and was dried for dehydration. A temperature of LiCl after dehydration was raised to 700° C. in an Mo container by an external heater to melt LiCl. An Sm metal powder was added to the molten LiCl as an Sm source. Addition of the Sm source was performed so that a molar ratio between LiCl and Sm becomes LiCl:Sm=100.0:2.5. Then, a cylindrical Co base material (diameter: 0.5 mm) was immersed in the molten LiCl. The Co base material was washed with acetone in advance. A reaction diffusion temperature was set to 700° C. and a reaction diffusion time was set to 9 hours. A stacked body in which an $SmCo_2$ film was formed on the Co base material was obtained by the reaction diffusion process.

(Heating Process)

A temperature of the obtained stacked body was raised until reaching 1050° C. Next, the stacked body was heated at a holding temperature of 1050° C. for 24 hours without applying a magnetic field to the stacked body. Then, the stacked body was cooled down without applying a magnetic field to the stacked body, thereby obtaining a cylindrical SmCo-based magnet. A temperature-rising rate was set to 0.15° C./second, and a temperature-dropping rate was set to 20° C./second. An atmosphere in the heating process was set to Ar. It was confirmed by an X-ray diffraction measuring device and an energy dispersive X-ray analyzing device that the obtained SmCo-based magnet has a structure in which the $Sm_2Co_{17}$ film and the $SmCo_5$ film were formed on the Co base material in this order.

Example 11

A cylindrical SmCo-based magnet was obtained in a similar manner as in Example 10 except that the molar ratio between LiCl and Sm in the reaction diffusion process was set to a value shown in Table 4. It is confirmed that by an X-ray diffraction measuring device and an energy dispersive X-ray analyzing device that the obtained SmCo-based magnet has a structure in which the $Sm_2Co_{17}$ film and the $SmCo_5$ film were formed on the Co base material in this order.

Examples 12 and 13

A stacked body was obtained in a similar manner as in Example except that the reaction diffusion time and the diameter of the Co base material in the reaction diffusion process were set to values shown in Table 4. A cylindrical SmCo-based magnet was obtained in a similar manner as in Example 10 except that the holding time in the heating process was set to 25 hours. It was confirmed by an X-ray diffraction measuring device and an energy dispersive X-ray analyzing device that the obtained SmCo-based magnet has a structure in which the $Sm_2Co_{17}$ film and the $SmCo_5$ film were formed on the Co base material in this order.

TABLE 4

| | Amount of Sm added to 100 parts by mole of LiCl [part by mole] | Diameter of Co base material [mm] | Reaction diffusion time [hour] |
|---|---|---|---|
| Example 10 | 2.5 | 0.5 | 9 |
| Example 11 | 4.5 | 0.5 | 9 |
| Example 12 | 2.5 | 0.7 | 12.5 |
| Example 13 | 2.5 | 0.85 | 12.5 |

<Evaluation of SmCo-Based Magnet Film>

Examples 1 to 9, and Comparative Examples 1 to 4

The following evaluation was performed with respect to the SmCo-based magnet films obtained in the respective examples.

(Film Thickness Measurement of $Sm_2Co_{17}$ Film and $SmCo_5$ Film)

Each of the obtained SmCo-based magnet films was embedded in a resin. Apart of the resin was polished to expose a cross-section of the SmCo-based magnet film from the resin. The exposed cross-section was observed with a scanning electron microscope (product name: SU5000, manufactured by Hitachi High-Tech Corporation) to measure a film thickness of the $Sm_2Co_{17}$ film and the $SmCo_5$ film. At this time, an observation magnification was adjusted so that the entirety of the film to be observed is placed within a field of view. Results are shown in Table 5.

(Measurement of Degree of Orientation of Crystal Orientation of $SmCo_5$)

Figure 9:
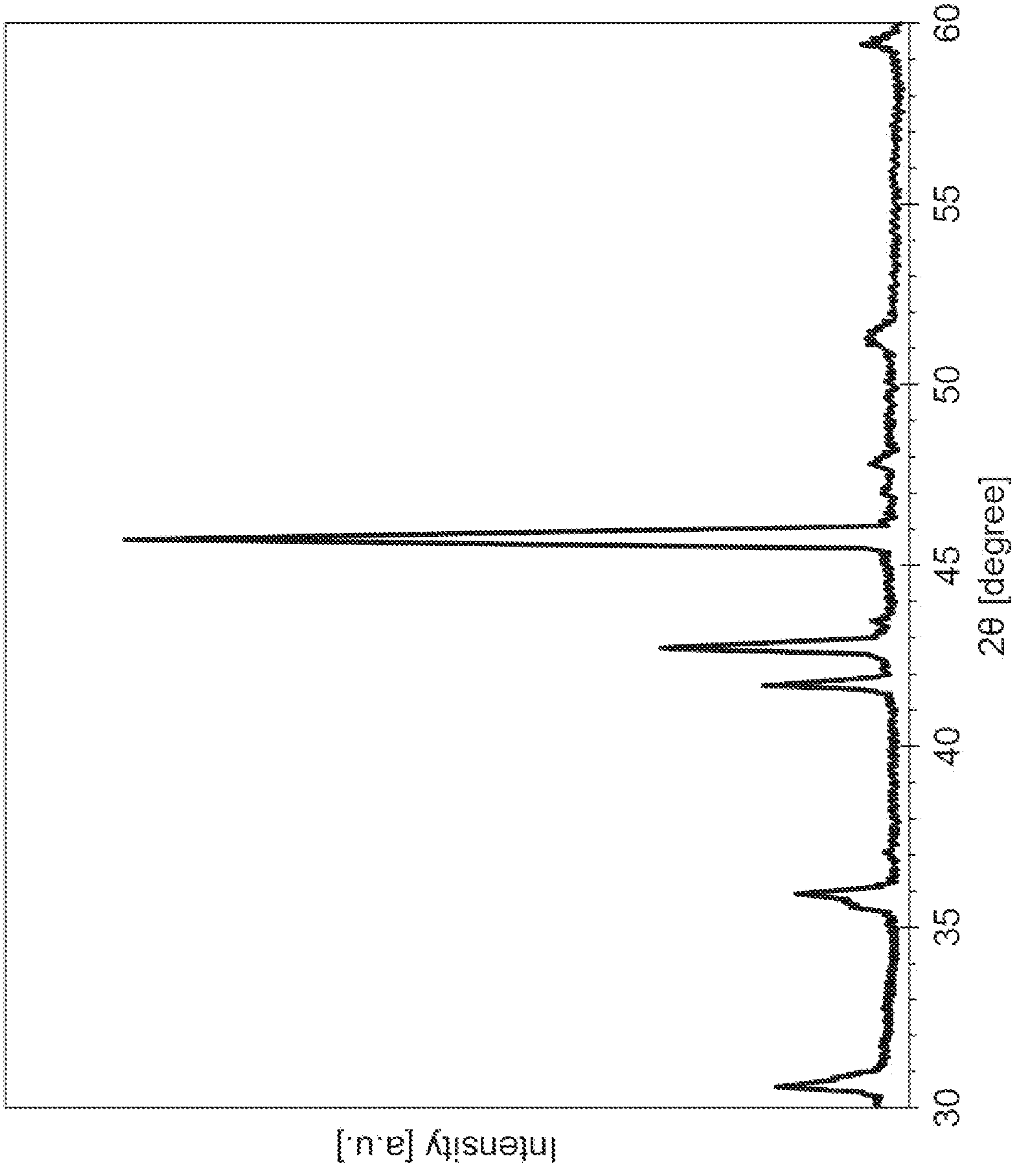
FIG. 9 is an X-ray diffraction profile obtained by irradiating an $SmCo_5$ film of an SmCo-based magnet film obtained in Example 2 with X-rays.

X-ray diffraction measurement was performed with respect to the $SmCo_5$ film in the obtained SmCo-based magnet film by using X-ray diffraction measuring device (product name: RINT-2000, manufactured by Rigaku Corporation). The measurement was performed at room temperature by using CuKα. The degree of orientation of a crystal orientation [002] of $SmCo_5$ was calculated by Expression (1) from peaks in a range of 2θ=30° to 60° in an obtained X-ray profile. Note that, in the range of 2θ=30° to 60°, peaks derived from a (101) plane, a (110) plane, a (200) plane, a (111) plane, a (002) plane, a (201) plane, and a (112) plane were measured. Angles θ made between the (002) plane and the respective crystal planes, and a vector correction coefficient β were set to values shown in Table 6. The degree of orientation calculated is shown in Table 5. In addition, an X-ray diffraction profile obtained from the SmCo-based magnet film in Example 2 is illustrated in FIG. 9.

(Measurement of Surface Magnetic Flux Density of SmCo-Based Magnet Film)

A probe of a hall element ((product name: HG0712, manufactured by Asahi Kasei Microdevices Corporation) was brought into contact with a film surface of the $SmCo_5$ film in the obtained SmCo-based magnet film, and an output voltage was converted into a magnetic flux density, thereby measuring a surface magnetic flux density of the SmCo-based magnet film. Results are shown in Table 5.

(Measurement of Degree of Unevenness of SmCo-Based Magnet Film)

The obtained SmCo-based magnet film was embedded in a resin. A part of the resin was polished to expose a cross-section of the SmCo-based magnet film from the resin. The exposed cross-section was observed with a scanning electron microscope (product name: SU5000, manufactured by Hitachi High-Tech Corporation) to obtain a backscattered electron image. An acceleration voltage was set to 10 to 15 kV and a working distance (WD) was set to 10 to 15 mm at the time of obtaining the backscattered electron image. A portion (rectangle) to be provided for analysis was cut out from the obtained backscattered electron image. Cutting-out of the backscattered electron image was performed so that any one side of an image cut out as illustrated in FIG. 2 and a side opposite to the side, and an interface of the $Sm_2Co_{17}$ film and the $SmCo_5$ film intersect each other, and the interface is placed between the remaining two sides. In addition, cutting-out of the backscattered electron image was performed so that a length of a straight line connecting both ends of the interface of the $Sm_2Co_{17}$ film and the $SmCo_5$ film to be described later becomes 100 μm or more. The cut-out image was subjected to image quality adjustment, binarization processing, and edge (contour) extraction processing. In addition, a length of the interface of the $Sm_2Co_{17}$ film and the $SmCo_{17}$ film in the cut-out image was measured. In addition, a length of the straight line connecting both ends of the interface of the $Sm_2Co_{17}$ film and the $SmCo_5$ film in the cut-out image was measured. As a reference of the length, a length displayed in a scale bar was used. The degree of unevenness was calculated by dividing the length of the interface of the $Sm_2Co_{17}$ film and the $SmCo_5$ film by the length of the straight line connecting both ends of the interface of the $SmCo_5$ film in the cut-out image. A measurement magnification was 1000 times. The number of sites for observation by the SEM was set to two or more so as not to analyze only a part. The degree of unevenness is set to an average value of the degree of unevenness obtained from each of images of two or more sites. Results are shown in Table 5.

TABLE 5

| | Film thickness [μm] | | | Degree of orientation | Surface magnetic flux |
|---|---|---|---|---|---|
| | $SmCo_5$ film | $Sm_2Co_{17}$ film | Degree of unevenness | of $SmCo_5$ [%] | density [mT] |
| Example 1 | 2.8 | 6.7 | 1.07 | 79 | 7.6 |
| Example 2 | 9.5 | 4.7 | 1.21 | 70 | 15.1 |
| Example 3 | 11.4 | 4.2 | 1.24 | 87 | 16.2 |
| Example 4 | 51.0 | 10.3 | 1.30 | 96 | 30.5 |
| Example 5 | 49.5 | 12.1 | 1.18 | 95 | 24.7 |
| Example 6 | 105.6 | 6.8 | 1.46 | 95 | 59.1 |
| Example 7 | 152.3 | 4.2 | 1.51 | 97 | 86.0 |
| Example 8 | 150.5 | 4.4 | 1.35 | 94 | 69.2 |
| Example 9 | 198.2 | 3.9 | 1.94 | 96 | 118.5 |
| Comparative Example 1 | 2.6 | — | — | 49 | 1.7 |
| Comparative Example 2 | 9.4 | — | — | 47 | 5.6 |
| Comparative Example 3 | — | 2.9 | — | — | 0.1 |
| Comparative Example 4 | 0.8 | — | — | 50 | 0.3 |

TABLE 6

| Crystal plane | θ (°) | β = cos θ |
|---|---|---|
| (101) plane | 42.4 | 0.74 |
| (110) plane | 90 | 0 |
| (200) plane | 90 | 0 |
| (111) plane | 57.7 | 0.53 |
| (002) plane (reference plane) | 0 | 1.00 |
| (201) plane | 61.3 | 0.48 |
| (112) plane | 38.4 | 0.78 |

The SmCo-based magnet film obtained in each of the examples included the $Sm_2Co_{17}$ film and the degree of orientation of $SmCo_5$ was 70% or more, and thus the surface magnetic flux density was 7.6 mT or more.

<Evaluation of Cylindrical SmCo-Based Magnet>

Examples 10 to 13

The following evaluation was performed with respect to a cylindrical SmCo-based magnet obtained in each of the examples.

(Film Thickness Measurement of $Sm_2Co_{17}$ Film and $SmCo_5$ Film)

The obtained cylindrical SmCo-based magnet was embedded in a resin. A part of the resin was polished to expose a cross-section of the cylindrical SmCo-based magnet in a direction perpendicular to an axial direction from the resin. The exposed cross-section was observed with a scanning electron microscope (product name: SU5000, manufactured by Hitachi High-Tech Corporation) to measure a film thickness of the $Sm_2Co_{17}$ film and the $SmCo_5$ film. At this time, an observation magnification was adjusted so that the entirety of the film to be observed is placed within a field of view. Results are shown in Table 7.

(Measurement of Orientation of Crystal Orientation of $SmCo_5$)

Figure 10:
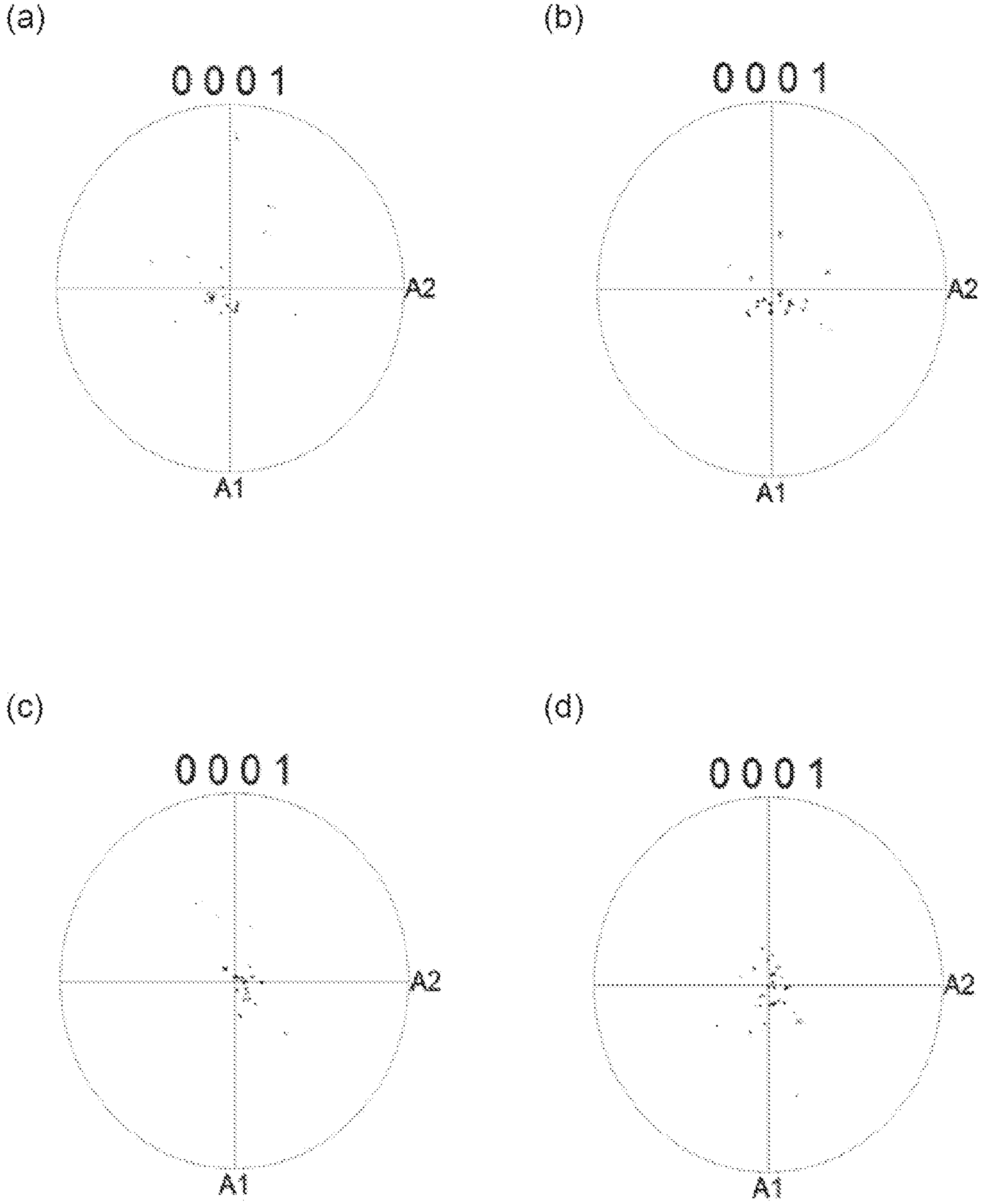
FIG. 10 is a pole diagram obtained by executing an EBSD method with respect to an SmCo-based magnet obtained in Example 10.

The obtained cylindrical SmCo-based magnet was embedded in a resin. A part of the resin was polished to expose a cross-section of the cylindrical SmCo-based magnet in a direction perpendicular to an axial direction. In $SmCo_5$ on the exposed cross-section, the orientation of the crystal orientation of $SmCo_5$ was measured by an electron back scatter diffraction patterns (EBSD) method. As a measurement device of EBSD, Versa3D (product name, manufactured by EFI) was used. As illustrated in FIG. 5, a measurement site was set to totally four sites including a site Y1 that is spaced apart in a Y direction perpendicular to a normal direction at the center of gravity of the cross-section, a site Y2 that is spaced apart in a −Y direction opposite to the Y direction, a site X1 that is spaced apart in an X direction perpendicular to the Y direction, and a site X2 that is spaced apart in a −X direction opposite to the X direction. Measurement results in Example 10 are illustrated in FIGS. 10(*a*) to 10(*d*). FIG. 10(*a*) is a pole diagram of the crystal orientation [00L] of $SmCo_5$ in a case of observing the Y1 in the −Y direction with an XZ plane set as the front. FIG. 10(*b*) is a pole diagram of the crystal orientation [00L] of $SmCo_5$ in a case of observing the Y2 in the Y direction with the XZ plane set as the front. FIG. 10(*c*) is a pole diagram of the crystal orientation [00L] of $SmCo_5$ in a case of observing the X1 in the −X direction with a YZ plane set as the front. FIG. 10(*d*) is a pole diagram of the crystal orientation [00L] of $SmCo_5$ in a case of observing the X2 in the X direction with the YZ plane set as the front. The pole diagrams are diagrams showing a crystal orientation with a stereo projection method. In Each of the pole diagrams in FIG. 10, the center is the crystal orientation [00L]. That is, when the crystal orientation [00L] faces the front, a dot is placed at the center of the pole diagram. As can be seen from FIGS. 10(*a*) to 10(*d*), since dots are placed at the center of the pole diagram, it was confirmed that the crystal orientation [00L] of $SmCo_5$ is radially oriented in the cylindrical SmCo-based magnet. Since a similar measurement result as in Example 10 was also obtained in Examples 11 to 13, it was confirmed that the crystal orientation [00L] of $SmCo_5$ is radially oriented in the cylindrical SmCo-based magnet.

(Measurement of Surface Magnetic Flux Density of SmCo-Based Magnet)

The surface magnetic flux density of the cylindrical SmCo-based magnet was measured in a similar manner as in the measurement of the surface magnetic flux density of the SmCo-based magnet film. Results are shown in Table 7.

(Measurement of Degree of Unevenness of SmCo-Based Magnet Film)

The obtained cylindrical SmCo-based magnet was embedded in a resin. A part of the resin was polished to expose a cross-section perpendicular to an axis of the SmCo-based magnet from the resin. The exposed cross-section was observed with a scanning electron microscope (product name: SU5000, manufactured by Hitachi High-Tech Corporation.) to obtain a backscattered electron image. An acceleration voltage was set to 10 to 15 kV and a working distance (WD) was set to 10 to 15 mm at the time of obtaining the backscattered electron image. A portion (rectangle) to be provided for analysis was cut out from the obtained backscattered electron image. Cutting-out of the backscattered electron image was performed so that any one side of an image cut out as illustrated in FIG. 2 and a side opposite to the side, and an interface of the $Sm_2Co_{17}$ film and the $SmCo_5$ film intersect each other, and the interface is placed between the remaining two sides. In addition, cutting-out of the backscattered electron image was performed so that a length of a straight line connecting both ends of the interface of the $Sm_2Co_{17}$ film and the $SmCo_5$ film to be described later becomes 100 μm or more. The cut-out image was subjected to image quality adjustment, binarization processing, and edge (contour) extraction processing. In addition, a length of the straight line connecting both ends of the interface of the $Sm_2Co_{17}$ film and the $SmCo_5$ film in the cut-out image was measured. In addition, a length of the straight line connecting both ends of the interface of the $Sm_2Co_{17}$ film and the $SmCo_5$ film in the cut-out image was measured. As a reference of the length, a length displayed in a scale bar was used. The degree of unevenness was calculated by dividing the length of the interface of the $Sm_2Co_{17}$ film and the $SmCo_5$ film by the length of the straight line connecting both ends of the interface of the $Sm_2Co_{17}$ film and the $SmCo_5$ film in the cut-out image. A measurement magnification was 1000 times. The number of sites for observation by the SEM was set to two or more so as not to analyze only a part. The degree of unevenness is set to an average value of the degree of unevenness obtained from each of images of two or more sites. Results are shown in Table 7.

TABLE 7

| | Film thickness [μm] | | | | Surface magnetic |
|---|---|---|---|---|---|
| | $SmCo_5$ film | $Sm_2Co_{17}$ film | Degree of unevenness | Orientation state of $SmCo_5$ | flux density [mT] |
| Example 10 | 117.1 | 10.2 | 1.18 | Radial orientation | 36.1 |
| Example 11 | 123.5 | 8.9 | 1.21 | Radial orientation | 42.3 |
| Example 12 | 125.4 | 5.4 | 1.27 | Radial orientation | 118.0 |
| Example 13 | 107.1 | 5.4 | 1.32 | Radial orientation | 121.2 |

REFERENCE SIGNS LIST

10: Mo substrate, 12: Co substrate (Co base material), 15: yoke portion, 17: magnet portion, 20: $Sm_2Co_{17}$ film, 25: $SmCo_2$ film, 30: $SmCo_5$ film, 40: non-oriented $SmCo_5$ film, 50, 51: stacked film, 52: stacked body, 70: alloy film, 100: SmCo-based magnet film, 200: magnet, 300: SmCo-based magnet.

The invention claimed is:

1. A magnet comprising:
a yoke portion that contains a soft magnetic material; and
a magnet portion that is formed on a main surface of the yoke portion and contains a hard magnetic material,
wherein an interface of the magnet portion and the yoke portion as viewed in cross-section has an uneven shape,
wherein a degree of unevenness of the uneven shape of the interface satisfies a relationship of 1.21<degree of unevenness<1.94, the degree of unevenness is determined by dividing a length of the interface between a first end and a second end thereof by a length of a straight line connecting the first end and the second end,
wherein the yoke portion contains $Sm_2Co_{17}$ as the soft magnetic material,
the magnet portion contains $SmCo_5$ as the hard magnetic material,
a crystal orientation [00L] of $SmCo_5$ is oriented in a thickness direction of $SmCo_5$, and
a degree of orientation of $SmCo_5$ is 70% or more,
wherein the degree of orientation of $SmCo_5$ is determined by a ratio of a sum of one or more diffraction peaks based on a crystal orientation [00L] component to a sum of diffraction peaks based on a crystal plane (hk1) of $SmCo_5$.

2. The magnet according to claim 1,
wherein $Sm_2Co_{17}$ is formed on a main surface of $SmCo_5$.

3. The magnet according to claim 1,
wherein the thickness of the magnet portion is 1 to 200 μm.

4. A micromotor that uses the magnet according to claim 1.

5. A microactuator that uses the magnet according to claim 1.

6. A sensor that uses the magnet according to claim 1.

7. A magnet comprising:
a yoke portion that contains a soft magnetic material, wherein the yoke portion contains $Sm_2Co_{17}$ as the soft magnetic material; and
a magnet portion that is formed on a main surface of the yoke portion and contains a hard magnetic material,
wherein an interface of the magnet portion and the yoke portion as viewed in cross-section has an uneven shape,
wherein the magnet portion contains $SmCo_5$ as the hard magnetic material,
a crystal orientation [00L] of $SmCo_5$ is oriented in a thickness direction of $SmCo_5$, and
a degree of orientation of $SmCo_5$ is 70% or more,
wherein the degree of orientation of $SmCo_5$ is determined by a ratio of a sum of one or more diffraction peaks based on a crystal orientation [00L] component to a sum of diffraction peaks based on a crystal plane (hk1) of $SmCo_5$.

8. The magnet according to claim 7,
wherein a degree of unevenness of the uneven shape of the interface satisfies a relationship of 1.0<degree of unevenness<2.0, the degree of unevenness is determined by dividing a length of the interface between a first end and a second end thereof by a length of a straight line connecting the first end and the second end.

9. The magnet according to claim 7,
wherein $Sm_2Co_{17}$ is formed on a main surface of $SmCo_5$.

10. The magnet according to claim 7,
wherein the thickness of the magnet portion is 1 to 200 μm.

11. A micromotor that uses the magnet according to claim 7.

12. A microactuator that uses the magnet according to claim 7.

13. A sensor that uses the magnet according to claim 7.

14. A micromotor that uses the magnet according to claim 8.

15. A microactuator that uses the magnet according to claim 8.

16. A sensor that uses the magnet according to claim 8.

17. A micromotor that uses the magnet according to claim 9.

18. A microactuator that uses the magnet according to claim 9.

19. A sensor that uses the magnet according to claim 9.

* * * * *